United States Patent [19]

Sakata

[11] Patent Number: 5,251,045
[45] Date of Patent: Oct. 5, 1993

[54] MAGNIFICATION CHANGING SYSTEM FOR A COPIER

[75] Inventor: Seiji Sakata, Yokohama, Japan

[73] Assignee: Ricoh Company, Ltd., Tokyo, Japan

[21] Appl. No.: 911,363

[22] Filed: Jul. 13, 1992

Related U.S. Application Data

[63] Continuation of Ser. No. 752,201, Aug. 21, 1991, abandoned, which is a continuation of Ser. No. 525,317, May 21, 1990, abandoned, which is a continuation of Ser. No. 191,329, May 9, 1988, abandoned.

[30] Foreign Application Priority Data

May 9, 1987 [JP] Japan .................. 62-113071
May 9, 1987 [JP] Japan .................. 62-113072

[51] Int. Cl.$^5$ ............................................ H04N 1/40
[52] U.S. Cl. ........................... 358/451; 358/401
[58] Field of Search ................. 355/55; 358/449, 451, 358/448, 452, 443, 453, 401

[56] References Cited

U.S. PATENT DOCUMENTS

| | | | |
|---|---|---|---|
| 4,587,621 | 5/1986 | DuVall | 355/55 |
| 4,624,552 | 11/1986 | Asako | 355/55 |
| 4,633,405 | 12/1986 | Ito | 355/14 R |
| 4,752,809 | 6/1988 | Ito | 355/7 |
| 4,847,662 | 7/1989 | Yamada | 355/55 |
| 4,849,829 | 7/1989 | Maruyama et al. | 358/451 |

FOREIGN PATENT DOCUMENTS 2139454A 11/1984 United Kingdom ............... 358/451

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A magnification changing system for a copier. When any one of a document longitudinal key, a document lateral key, a copy longitudinal key and a copy lateral key is pressed, all the data associated with that key are displayed so that an operator is clearly informed of whether or not the entry of particular data is requested.

38 Claims, 28 Drawing Sheets

NO.

1 - 25%
2 - 50%
3 - 61%
4 - 71%
5 - 82%

6 - 87%
7 - 93%
8 - 115%
9 - 122%
10 - 141%

11 - 200%
12 - 400%

MAGNIFICATION CHANGING SYSTEM FOR A COPIER

This application is a continuation of application Ser. No. 07/752,201, filed on Aug. 21, 1991, now abandoned, which is a continuation of application Ser. No. 07/525,317, filed on May 21, 1990, now abandoned, which is a continuation of application Ser. No. 191,329, filed on May 9, 1988, now abandoned.

BACKGROUND OF THE INVENTION

The present invention relates to a magnification changing system for a copier.

A problem with a prior art copier is that in the event of a change of magnification it is difficult for a person to recognize the kind of data which the copier requests. Hence, the manual operation is complicated and awkward.

SUMMARY OF THE INVENTION

It is therefore an object of the present invention to provide a magnification changing system for a copier which is easy to operate.

It is another object of the present invention to provide a generally improved magnification changing system for a copier.

In accordance with the present invention, in a magnification changing system for a copier, in an independent longitudinal and lateral magnification change mode of the copier a longitudinal magnification and a lateral magnification are displayed when the magnifications are set, and an exclusive area is provided for setting a magnification other than the longitudinal and lateral magnifications being displayed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
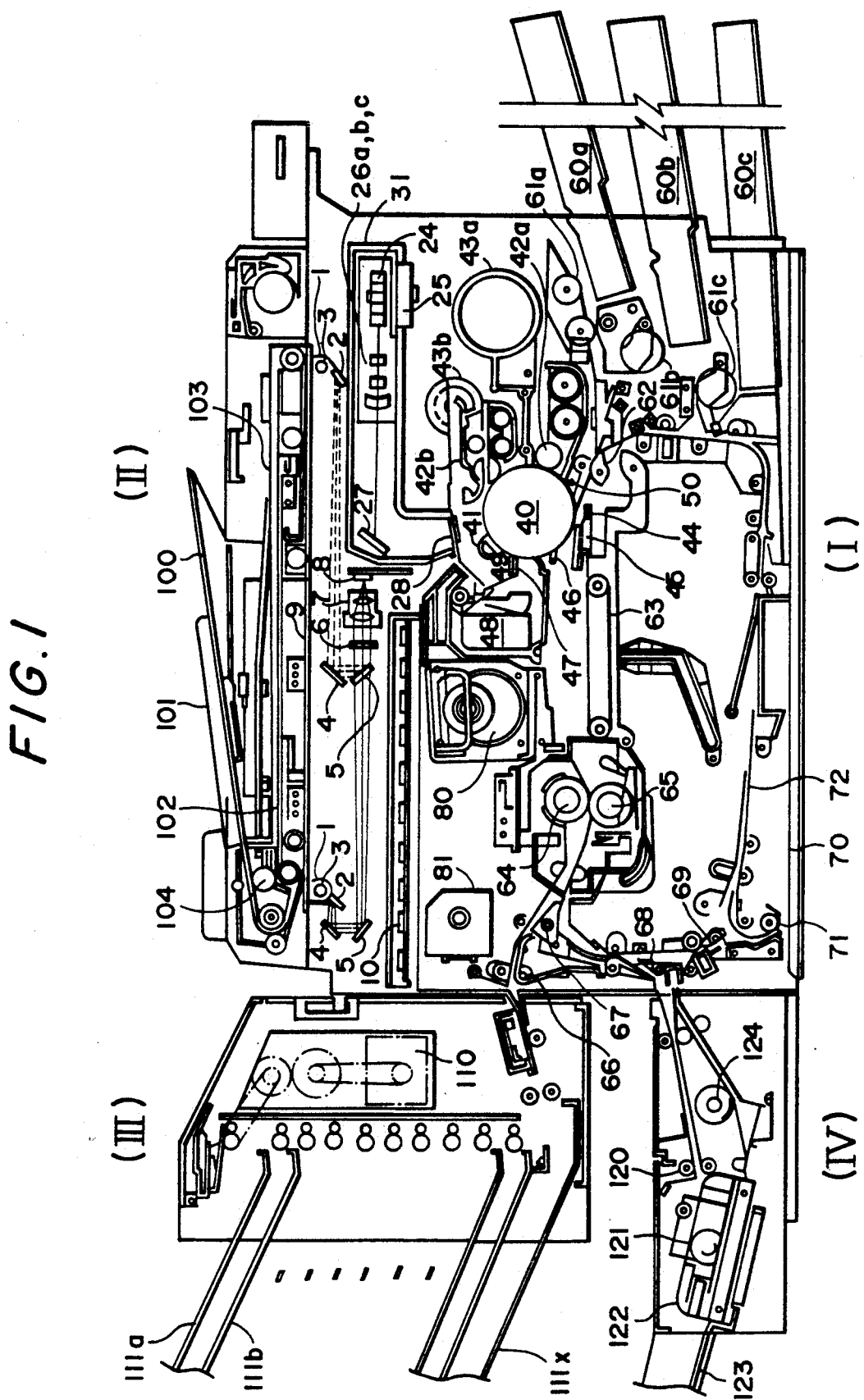
FIG. 1 is a view showing the overall construction of a digital copier in accordance with the present invention.
Figure 2:
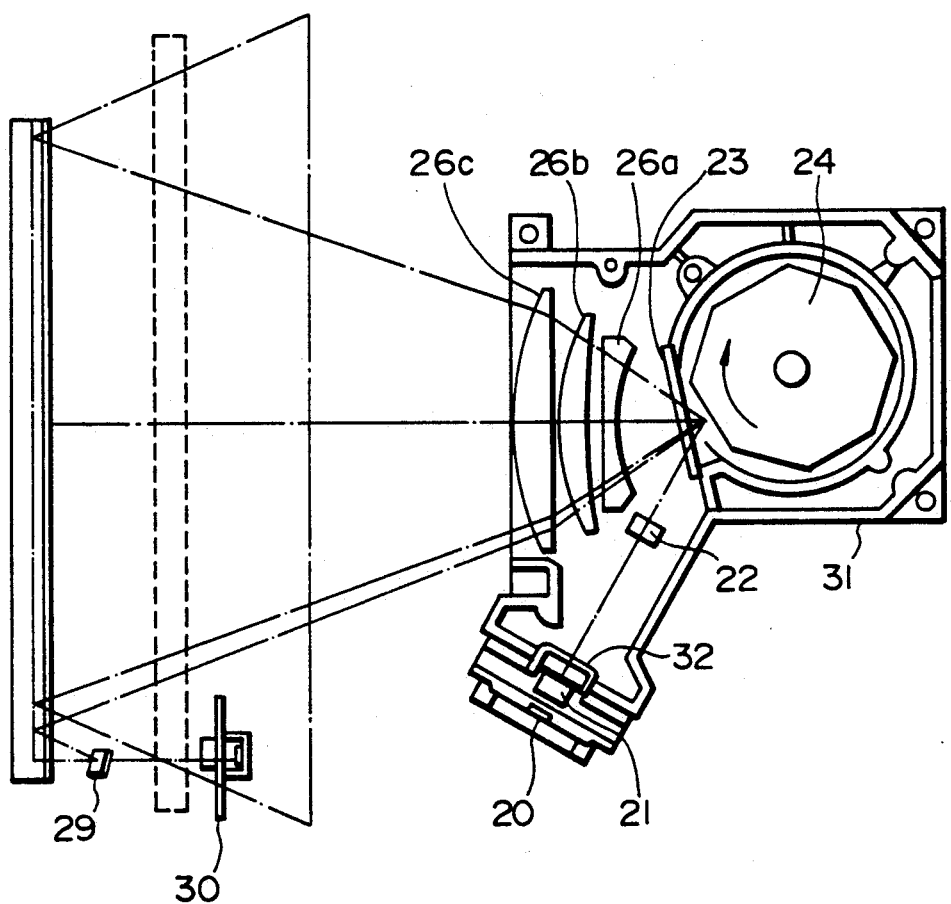
FIG. 2 is a plan view of a writing section.

Referring to FIGS. 1 and 2 of the drawings, a digital copier embodying the present invention is shown. The overall construction of the digital copier will be described first, with reference to FIG. 1. As shown in FIG. 1, the digital copier is made up of four units, i.e., a copier body (I), an ADF (II), a sorter (III), and a two-side reversal unit (IV). The copier body (I) includes a scanner section, a writing section, a photoconductive element section, a developing section, and a sheet feed section which are constructed and operated as follows.

Scanner Section

A first scanner having a mirror 1, a light source 3 and a first mirror 2 is movable at a predetermined speed. A second scanner is movable at half the speed of the first scanner and provided with a second mirror 4 and a third mirror 5. The first and second scanners optically scan an original document, not shown, which is laid on a glass platen 9. Imagewise light from the document is incident to a lens 7 via a color separating filter 6 and then focused onto a one-dimensional solid state imaging device 8.

While the light source may be implemented with a fluorescent lamp, halogen lamp or the like, use is commonly made of a fluorescent lamp which has stable wavelength and long service life. Although one light source 3 is used in the illustrative embodiment, two or more light sources 3 may be used as desired. Since imaging device 8 has a constant sampling clock, a fluorescent lamp has to be turned on at a higher frequency than the sampling clock in order to eliminate adverse influence on an image.

Usually, the imaging device 8 is implemented by a CCD. An image signal read by the imaging device 8 which is an analog signal is converted into a digital signal and then subjected to various kinds of image processing (binarization, tone processing, magnification change, edition, etc.) at an image processing board 10 to become a digital signal in the form of congregation of spots.

In this particular embodiment, the color separating filter 6 is movable into and out of an optical path which extends from the document to the imaging device 8 for the purpose of transmitting only the information associated with a necessary color. While the document is scanned, the filter 6 is moved into and out of the optical path to selectively enable a multi-transfer function, a two-side copy function and other various functions to produce a variety of kinds of copies as desired.

Writing Section

The image data undergone image processing are written on a photoconductive drum 40 in the form of congregation of light spots by raster scanning which uses a laser beam. While the laser beam may be implemented by a helium-neon (Ne-Ne) laser which has a wavelength of 633 nanometers and well matches to the sensitivity of a photoconductive element of a copier, it is very expensive and cannot be modulated without resorting to the intermediary of a complicated arrangement. In the illustrative embodiment an inexpensive and directly modulatable semiconductor laser is used taking account of the recent improvement in the sensitivity of a photoconductive element.

In FIG. 1, light issuing from a semiconductor laser 20 is collimated into a parallel beam by a collimating lens 21 and then shaped by an aperture 32 to become a beam having a predetermined shape. This beam is compressed in the subscanning direction by a first cylindrical lens 22 and then directed toward a polygon mirror 24. Having an accurate polygonal cross-section, the polygon mirror 24 is rotated by a polygon motor 25, FIG. 1, at a predetermined speed in a predetermined direction. The rotation speed of the mirror 24 is determined on the basis of the rotation speed and writing density of a photoconductive drum 40 as well as the number surfaces of the polygon mirror 24.

The laser beam incident to the polygon mirror 24 is deflected by the mirror 24 toward f-theta lenses 26a, 26b and 26c. Functions assigned to the f-theta lenses 26a to 26c are scanning the drum 40 at a constant rate by the laser beam whose angular velocity is constant, focusing the light beam onto the drum 40 such that the beams forms a minimum light spot, and compensating for tilting.

In a position outside of an image area, the laser beam coming out from the f-theta lenses 26a to 26c is reflected by a mirror 29 to reach a synchronization sensor 30. When a predetermined period of time expires since the synchronization sensor 30 has produced a synchronization signal representative of a head signal in the main scanning direction, one line of image data are delivered. This procedure is repeated thereafter to complete one full image.

Photoconductive Element Section

The photoconductive drum 40 has a photoconductive layer on its outermost periphery. In this embodiment, the photoconductive layer is implemented by an organic photoconductor (OPC) which is sensitive to the wavelength of 780 nanometers of a semiconductor layer, e.g. a-Si or Se-Te. As regards laser writing, while a negative/positive (N/P) process for illuminating an image area and a positive/positive (P/P) process for illuminating a background area are available, this embodiment uses the N/P process.

A charger 41 is provided with a grid adjacent to the drum 40 and uniformly charges the surface of the drum 40 to negative polarity. The laser beam illuminates an image area of the drum surface to lower its potential. As a result, a latent image is electrostatically formed in which the potential is about −750 volts to −800 volts in a background area and about −500 volts in an image area. A bias voltage of −500 volts to −600 volts is applied to a developing roller of any of developing units 42a and 42b to deposite negatively charged toner on the latent image, whereby the latent image is converted into a toner image.

Developing section

A main developing unit 42a and an auxiliary developing unit 42b are used in the illustrative embodiment. In a black-and-white reproduction mode, the auxiliary developing unit 42b and a toner container 43b associated therewith are removed. Specifically, a toner container 43a associated with the main developing unit 42a and the toner container 43b associated with the auxiliary developing unit 42b store black toner and color toner, respectively. The developing units 42a and 42b are selectively conditioned for development by, for example, changing the position of a main pole of one developing unit while the other developing unit is operated. This kind of development may be combined with the operation of the filter 6 and a multiple transfer function and a two-side copy function of a paper transport system in order to produce various kinds of color copies while editing color image data. Development in three or more colors may be implemented by three or more developing units which are fixedly arranged around the drum 40 or angularly movable to selectively reach a developing station.

The toner image produced by any of the developing units 42a and 42b is charged by a transfer charger 44 from behind to positive polarity and thereby transferred to a paper which is fed in synchronism with the rotation of the drum 40. The paper with the toner image is subjected to AC discharge by a separation charger 45 which is held integrally with the transfer charger 44, whereby it is removed from the drum 40. Toner remaining on the drum 40 without being transferred to the paper is scraped off from the drum 40 by a cleaning blade 47 and then collected in a tank 48. Further, the potential pattern remaining on the drum 40 is erased by a discharging lamp 49.

A photosensor 50 is located immediately after the developing station. Constituted by a light-emitting element and a light-sensitive element, the photosensot 50 is adapted to measure the image density in terms of a ratio between the reflectivity of a pattern portion and that of the other portion which are defined on the drum 40 by writing a predetermined pattern (black pattern or dot pattern) in a position corresponding to the photosensor 50 and developing it. When the image density measured is low, the photosensor 50 produces a toner supply signal. That the density does not increase even after the supply of toner may show that the remaining amount of toner is short.

Paper Feed Section

In this embodiment, the paper feed section includes a plurality of cassettes 60a, 60b and 60c. A paper with a toner image may be routed through a re-feed loop 72 for producing a two-sided copy or for feeding it again. When any of the cassettes 60a to 60c is selected and then a start button is depressed, a feed roll 61 (61a, 61b or 61c) is rotated to feed a paper until the paper abuts against a register roller 62 which is in a halt then. Timed to an image position on the drum 40, the register roller 62 begins to rotate to drive the paper to feed the paper toward the periphery of the drum 40. After the toner image has been transferred from the drum 40 to the paper at a transfer station, the paper is transported by a separation and transport section 63 to a fixing roller pair which is constituted by a heating roller 64 and a pressing roller 65, the fixing roller pair fixing the toner image on the paper.

In a usual copy mode, the paper with the toner image fixed thereon is directed by a pawl 67 toward an outlet which adjoins the sorter (III). In a multi-copy mode, the paper is guided by the separator pawl 67 downward and, without being redirected by other selector pawls 68 and 69, routed through the loop 72 to reach the register roller 62 again. A two-side copy mode may be selectively effected by the copier body (I) only or by the copier body (I) and the two-side reversal unit (IV). When only the copier body (I) is used, the paper directed downward by the selector pawl 67 is fed further downward by the pawl 68 and then guided by the pawl 69 toward a tray 70 which is located below the loop 72. Then, a roller 71 is actuated to return the paper toward the selector pawl 69 which, at this time, is oriented to guide the paper into the loop 72, so that the paper reaches the register roller 62.

ADF

The ADF (II) serves to automatically feed original documents one by one onto the glass platen 9 and then discharge them after they have been scanned. Specifically, documents stacked on a feed tray 100 are positioned in the widthwie direction by using a side guide 101. A feed roll 104 feeds one document at a time from the stack on the feed tray 100 and then a belt 102 transports the document to a predetermined position on the glass platen 9. After a desired number of copies have been produced, the belt 102 is actuated again to discharge the document to a discharge tray 103. The size of the document may be detected by sensing the position of the side guide 101 selected and counting the feed time.

Sorter

The sorter (III) is usable to distribute copies coming out of the copier body (I) to bins 111a to 111x in a manner well known in the art. By a plurality of rollers which are rotated by a motor 110, the copies are distributed to selected ones of the bins 111a to 111x depending upon the positions of pawls which are individually located in the vicinity of the bins.

Two-Side Reversal Unit (IV)

The two-side reversal unit (IV) helps the copier body (I) produce multiple two-sided copies collectively. Specifically, papers fed downward by the discharge roller 66 are guided by the pawl 167 into the two-side reversal unit (IV). In the unit (IV), the papers are sequentially stacked on a tray 123 by a discharge roller 120 while being positioned by a feed roller 121 and a side guide 122. The papers on the tray 123 are sequentially fed out of the unit (IV) by a re-feed roller 124 when the timing for copying a document on their back is reached. At this instant, the papers are directly driven into the loop 72 by the pawl 69 and therefrom to the register roller 62. Further shown in FIG. 1 are a glass 23 for insulating sound, a mirror 27, a glass 28 for intercepting dust, a main motor 80, and a fan motor 81.

Electrical Control Section

Figure 3A:
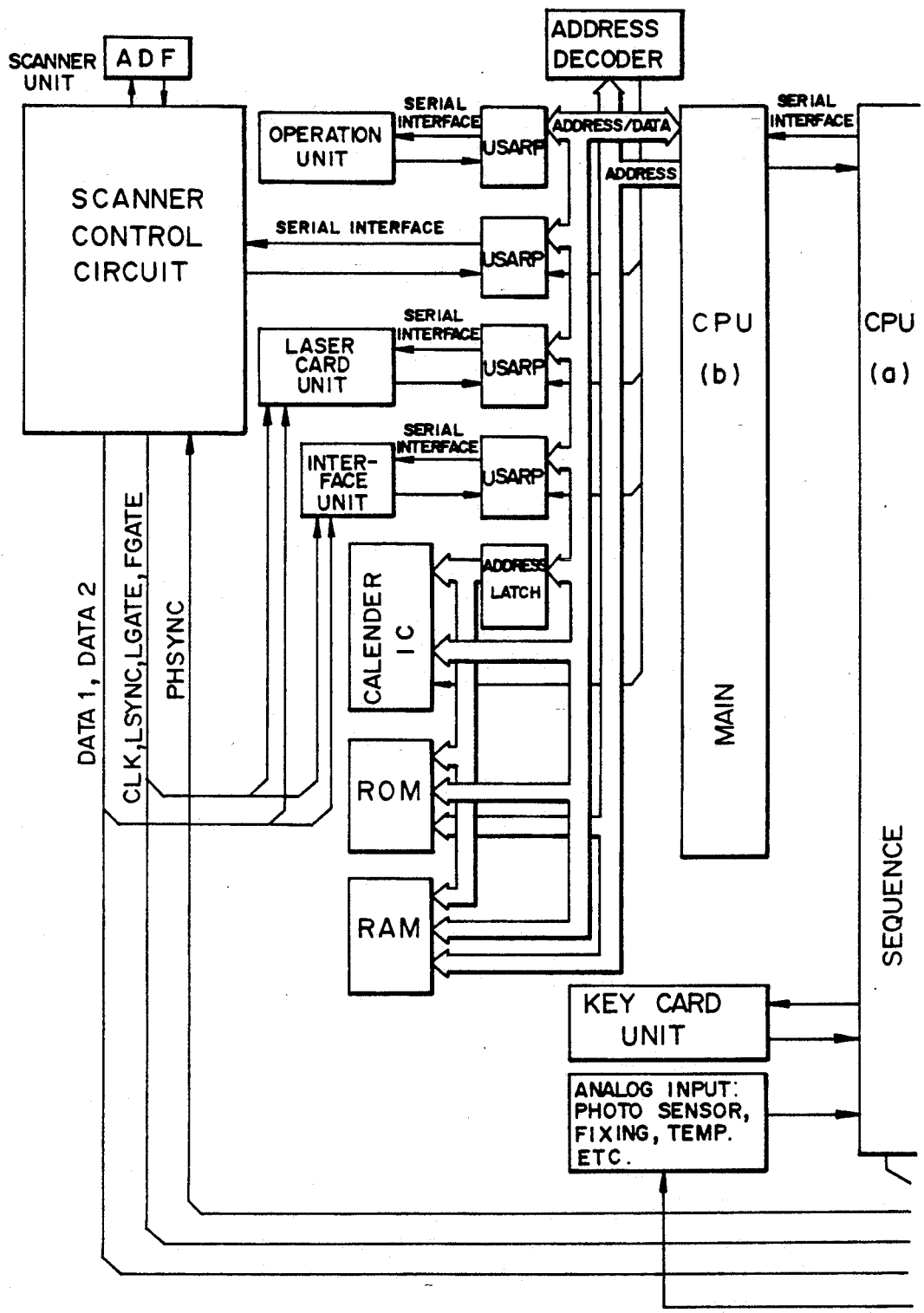
FIGS. 3a and 3b are schematic block diagrams which when combined show a printer section.
Figure 3B:
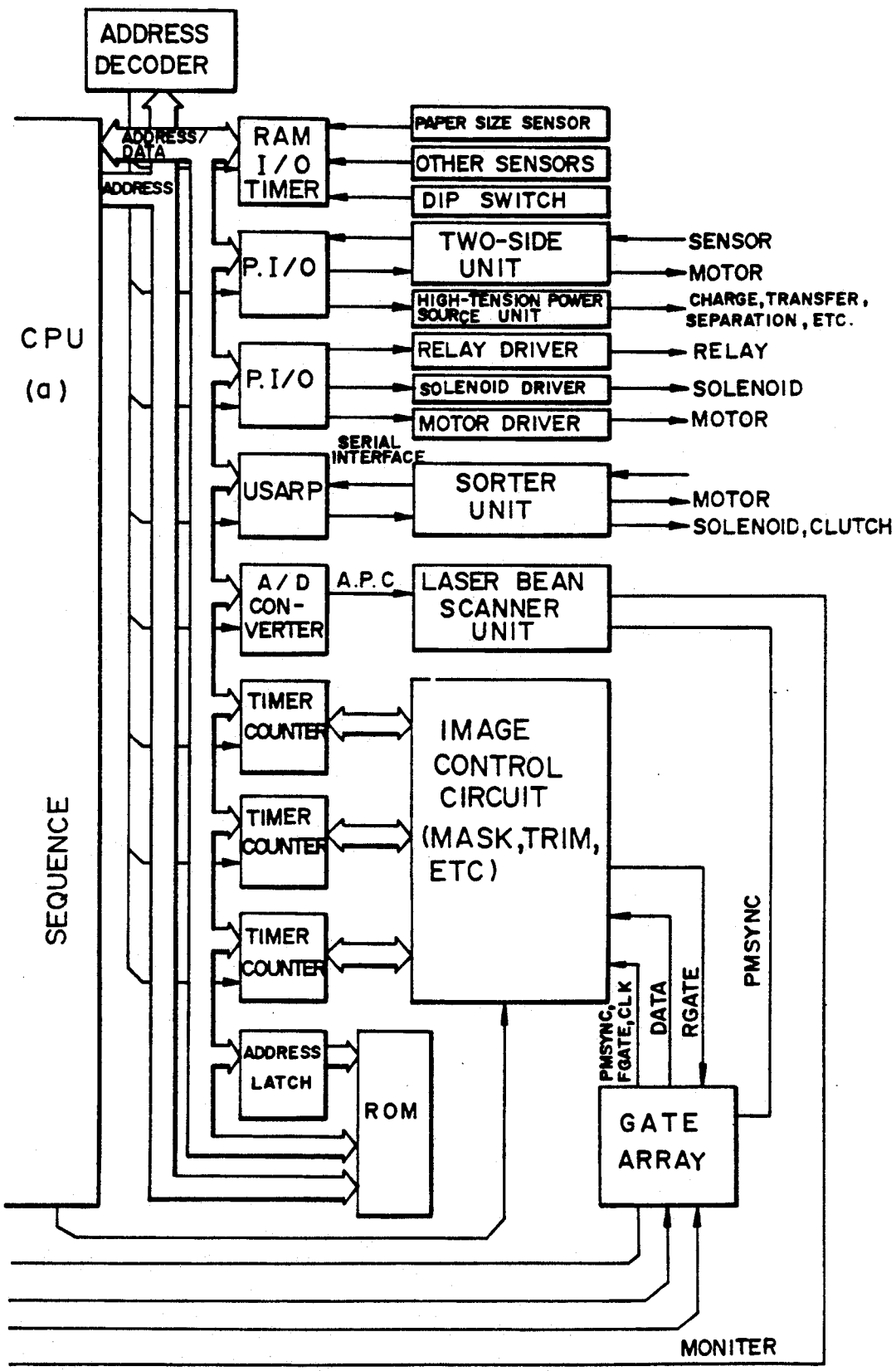

FIGS. 3a and 3b are blocks diagrams which in combination the overall construction of the copier. It is to be noted that a central processing unit CPU (a) is shown in both of FIGS. 3a and 3b to show how the two figures should be combined. A control unit of the copier includes two CPUs (a) and (b) which are assigned to sequence control and operation control, respectively. The CPUs (a) and (b) are interconnected by a serial interface (RS232C).

Sequence control which is associated with paper transport timings will be described first. Connected to the CPU (a) are a paper size sensor, sensors responsive to the discharge, register and others of a paper, the two-side unit, a high-tension power source unit, drivers associated with relays, solenoids, motors and the like, the sorter unit, the laser unit, and the scanner unit. The paper size sensor produces an electric signal by sensing the size and orientation of papers which are loaded in its associated paper cassette. Also connected to the CPU (a) are an oil end sensor, a toner end sensor, a door open sensor, a fuse sensor, etc.

The two-side unit is provided with a motor for regulating the widthwise position of papers, a paper feed clutch, a solenoid for switching a transport path, a paper presence/absence sensor, a home position sensor responsive to the position of a side fence, various sensors associated with paper transport, etc. The high-tension power source unit applies a different predetermined high-tension power to each of the charger, transfer charger, separation charger, and developing electrode. The drivers are associated with a sheet feed clutch, register clutch, counter, motor, toner supply solenoid, power relay, fixing heater, etc. The CPU (a) is connected the sorter unit by the serial interface so that papers may be transported at predetermined timings into the bins in response to a signal from the sequence. Applied to an analog input of the CPU (a) are a fixing temperature, photosensor output, laser diode condition being monitored, and laser diode reference voltage. The fixing temperature is maintained constant by on-off control in response to an output of a thermistor which is installed in the fixing section. As regards the photosensor output, a photosensor pattern produced at a predetermined timing is outputted by a phototransistor so that the CPU (a), based on the density of that patter, couples and uncouples the toner supply clutch to control the toner density. To maintain the output power of the laser diode, an analog-to-digital (AD) converter and the analog input of the CPU are used. Specifically, the control is such that the voltage monitored when the laser diode is turned on becomes equal to a predetermined reference voltage which is so selected as to cause the laser diode output power to be 2 milliwatts.

An image control circuit generates various timing signals associated with masking and trimming, erasure and photosensor pattern while delivering a video signal to the laser diode. A gate array functions to convert two-bit parallel image data which are outputted by the scanner into a one-bit serial signal in synchronism with a synchronizing signal PMSYNC which is generated by the scanner unit and a signal RGATE which is representative of a write start position.

The CPU (b) assigned to the operation control, or main CPU, controls a plurality of serial ports and a calendar integrated circuit (IC). Connected to the serial ports are the operating section, scanner, facsimile transceiver, interface unit and the like as well as the sequence control CPU (a). The operating section includes indicators which are individually representative of the states of keys and the conditions of the copier. While data entered on the keys are serially sent to the CPU (b), the indicators are selectively turned on by serial outputs of the CPU (b). The CPU (b) interchanges data associated with image processing and image reading with the scanner and interchanges preset data with the facsimile section and interface unit. The calendar IC stores date and time so that the copier may be turned on and off based on those data.

Figure 4:
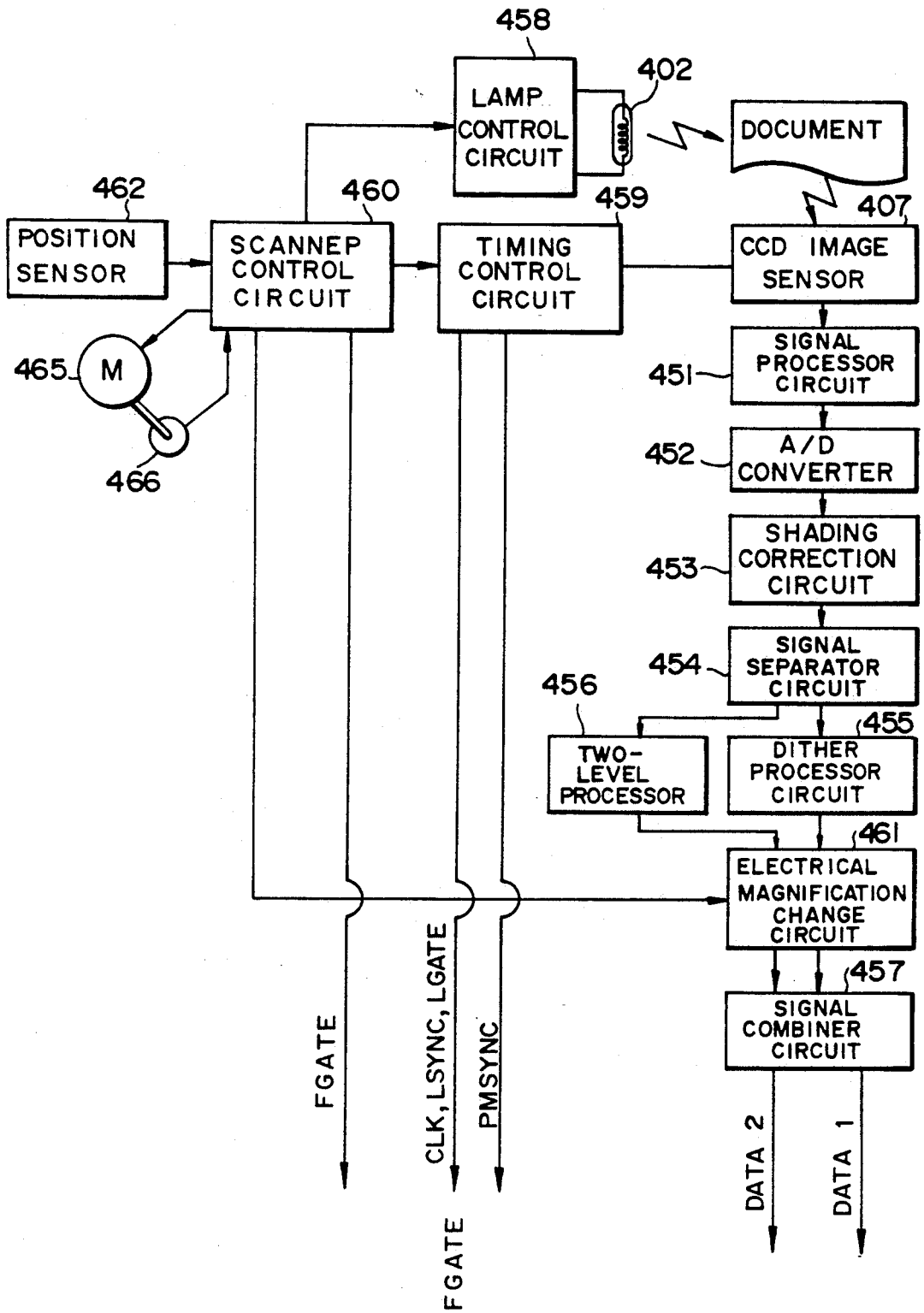
FIG. 4 is a schematic block diagram showing an image scanner section.

FIG. 4 is a block diagram of the image scanner section. An analog image signal outputted by a CCD image sensor 407 is amplified by a signal processor circuit 451 and then converted by an AD converter 452 into a multi-level digital signal. This signal is routed to a shading correction circuit 453 and therefrom to a signal separator circuit 454. Processing the input image data, the signal processor circuit 454 separates characters and other two-level image components and halftone image components. While the image components are applied to a two-level processor circuit, or binarizer, 456, the halftone image components are fed to a dither processor circuit 455. Using a predetermined threshold value, the two-level processor circuit 456 converts the input multi-level data into two-level data. The dither processor circuit 455 discriminates the input data by using various threshold values which are predetermined on a scanning point basis, thereby producing two-level data including halftone data. A signal combiner circuit 157 combines the two-level signal outputted by the two-level processor circuit 456 and the two level signal outputted by the dither processor circuit 455 so as to produce signals DATA1 and DATA 2.

A scanner control circuit 460 controls a lamp control circuit 458, a timing control circuit 459, an electrical magnification change circuit 461, and a scanner drive motor 465 in response to commands which are applied therefrom from the printer control section. The lamp control circuit 458 turns on and off the lamp 402 and controls the quantity of light, as commanded by the scanner control circuit 460. A rotary encoder 466 is connected to the output shaft of the scanner drive motor 465, and a position sensor 462 senses a reference position of a subscanning drive mechanism. The electrical magnification change circuit 461 applies electrical magnification change processing to the image data undergone dither processing and the image data undergone two-level processing, on the basis of magnification data which is set by the scanner control circuit 460 and associated with the main scanning.

The timing control circuit 495 produces various signals in response to a command from the scanner control circuit 460. Specifically, as reading begins, the timing control circuit 459 delivers to the CCD image sensor 407 a transfer signal for transferring one line of data and a shift clock adapted to deliver data one bit at a time from the shift register. The timing control circuit 459 delivers to an image reproduction control unit a pixel synchronizing clock CLK, a main scanning synchronizing clock LSYNC, and a main scanning valid period signal LGATE. The pixel synchronizing clock CLK is substantially the same as the shift clock which is applied to the CCD image sensor 407. While the main scanning synchronizing clock LSYNC is substantially the same as a main scanning synchronizing signal PMSYNC which the beam sensor of the image writing unit produces, it is inhibited from appearing when an image is not read. The main scanning valid period signal LGATE has a (logical) high level, H, when the output data DATA1 and DATA2 are considered valid. In the illustrative embodiment, the CCD image sensor 407 produces 4,800 bits of valid data per line. The data DATA1 and DATA1 are associated with odd pixels and even pixels, respectively.

The scanner control circuit 460 responds to a read start command from the printer control section by turning on the lamp 402, driving the scanner drive motor 465, and controlling the timing control circuit 459 to thereby cause the CCD image sensor 407 to start reading an image. Simultaneously, the scanner control circuit 460 turns a subscanning valid period signal FGATE to a high level. This signal FGATE becomes a low level, L, as a period of time necessary for scanning a maximum reading length (lengthwise dimension of a paper of format A in the illustrative embodiment).

Details of control which occurs in the copy mode will be described.

Figure 5:
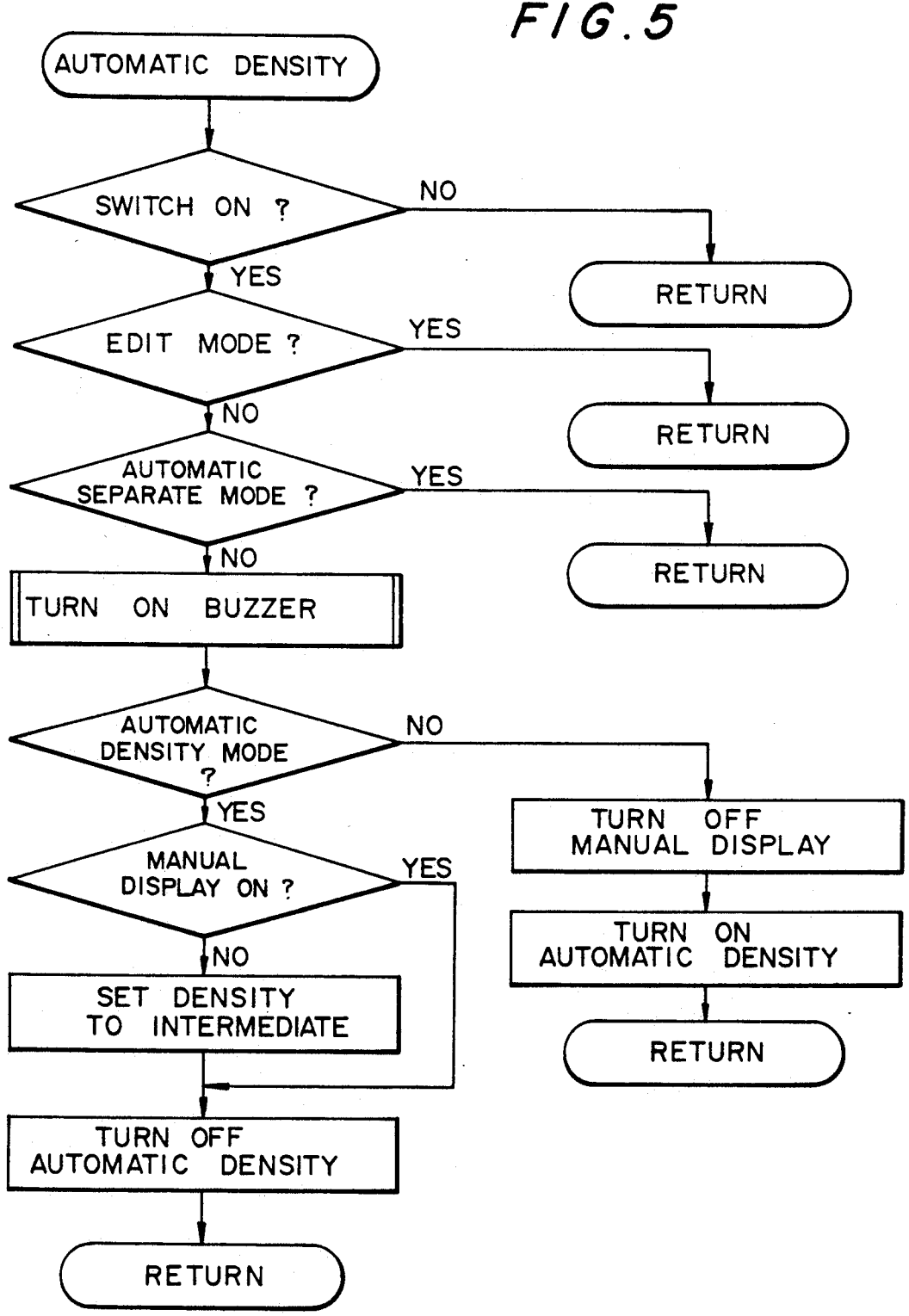
FIG. 5 is a flowchart demonstrating an automatic density setting procedure.

Referring to FIG. 5, a flowchart representative of automatic density setting is shown. When an automatic density switch is pressed, the key input is accepted and a buzzer is energized if the current mode is neither an edit mode (outline and marker) nor an automatic separate mode. If the automatic density mode has been set up and if a manual mode indicator is on, an automatic density LED indicator is turned off. If the manual indicator is off, the manual notch "4 (medium density)" is selected and the automatic density mode is cleared. When the automatic density mode is off, the manual LED indicator is turned off and the automatic indicator is turned on.

Figure 6:
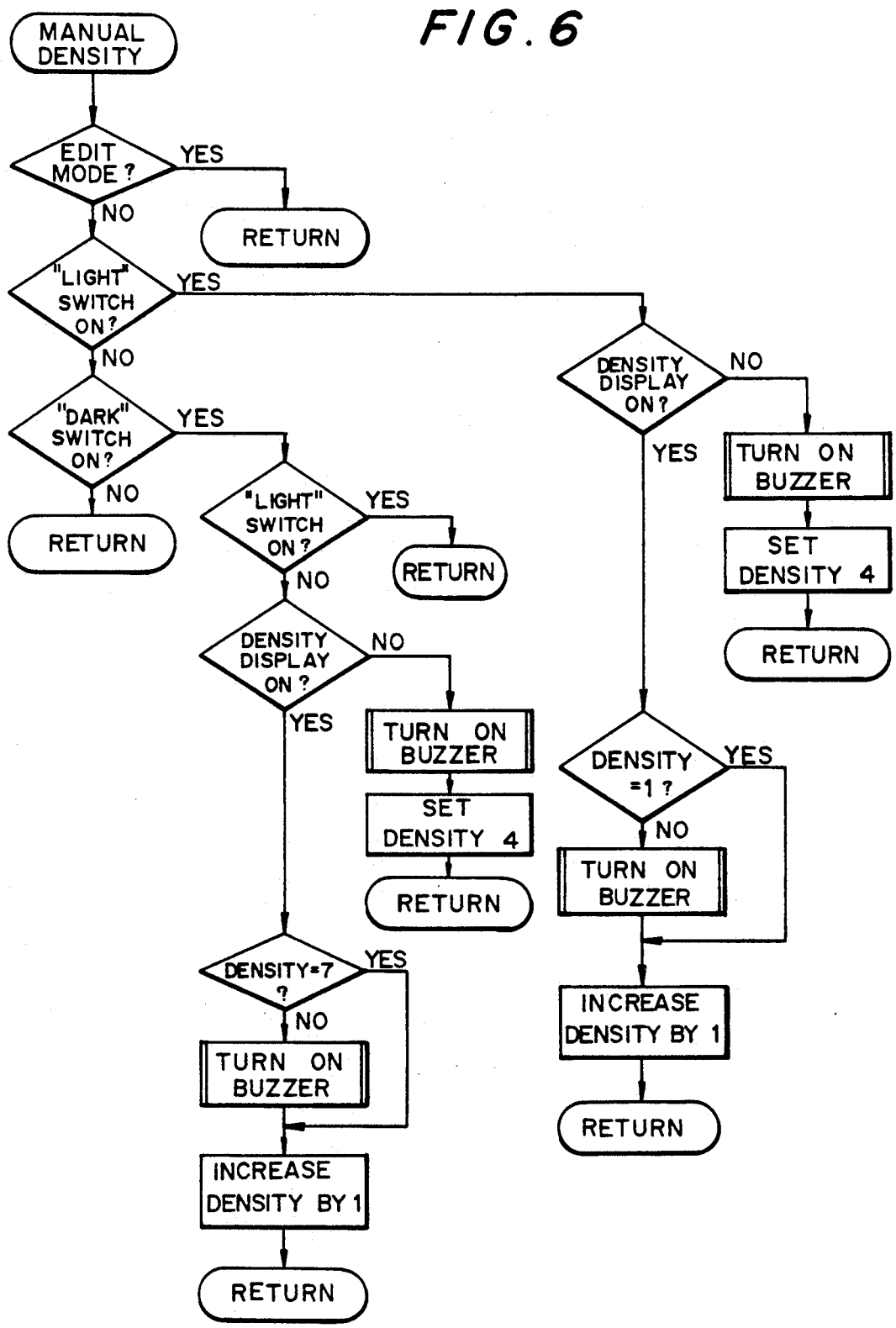
FIG. 6 is a flowchart demonstrating a manual density setting procedure.
Figure 7:
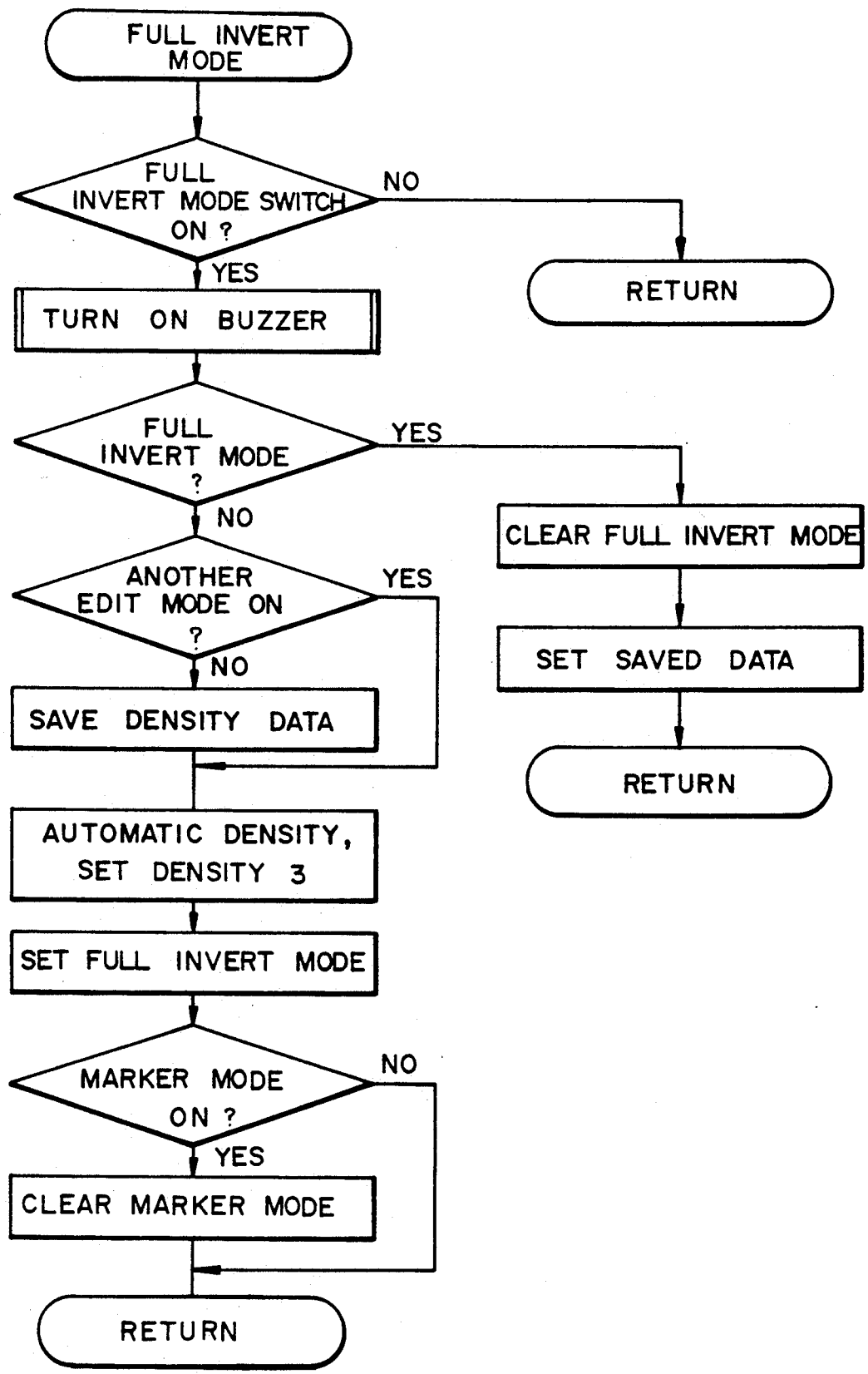
FIG. 7 is a flowchart representative of a full-face inversion mode.
Figure 8:
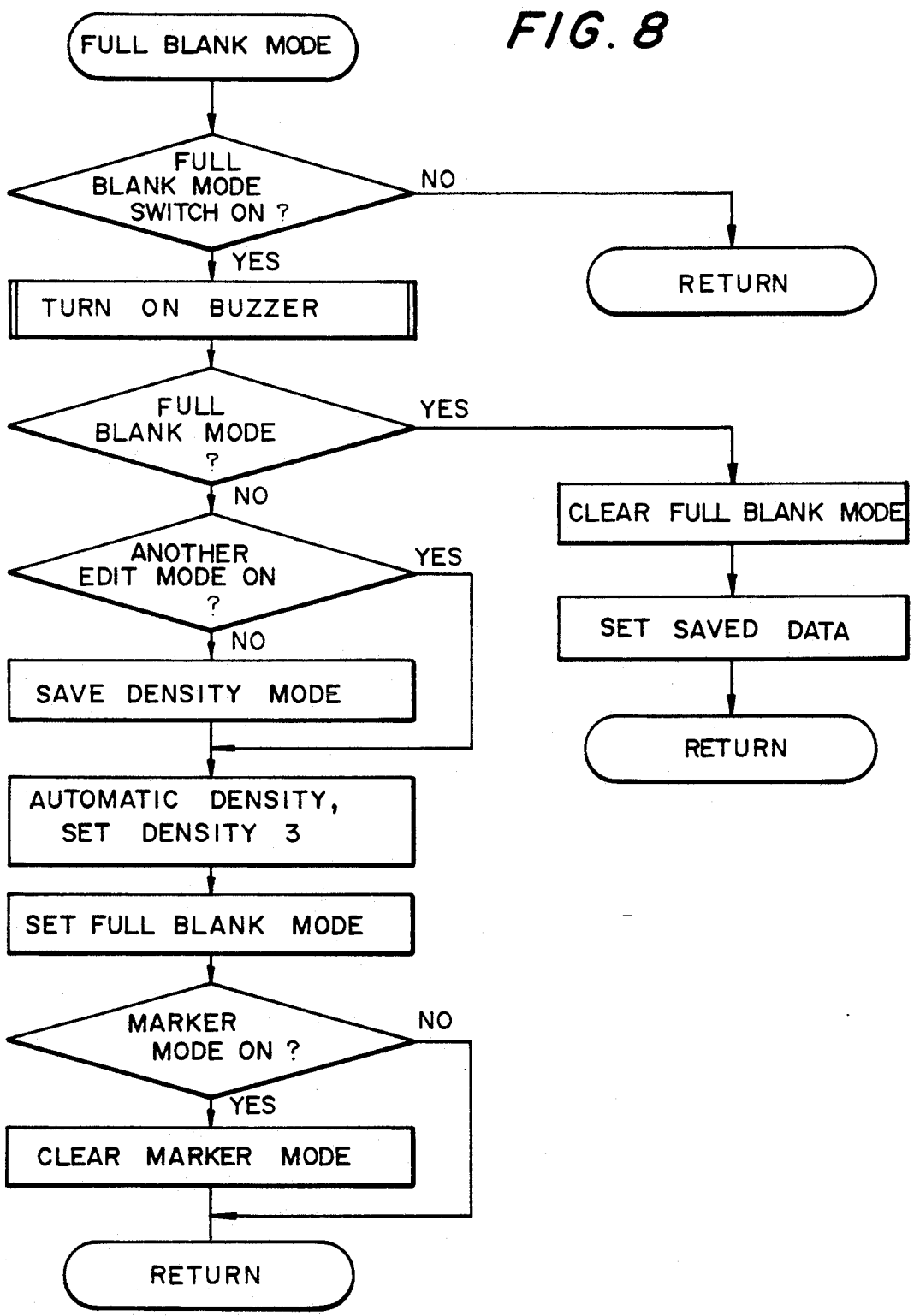
FIG. 8 is a flowchart representative of a full-face blank mode.
Figure 9:
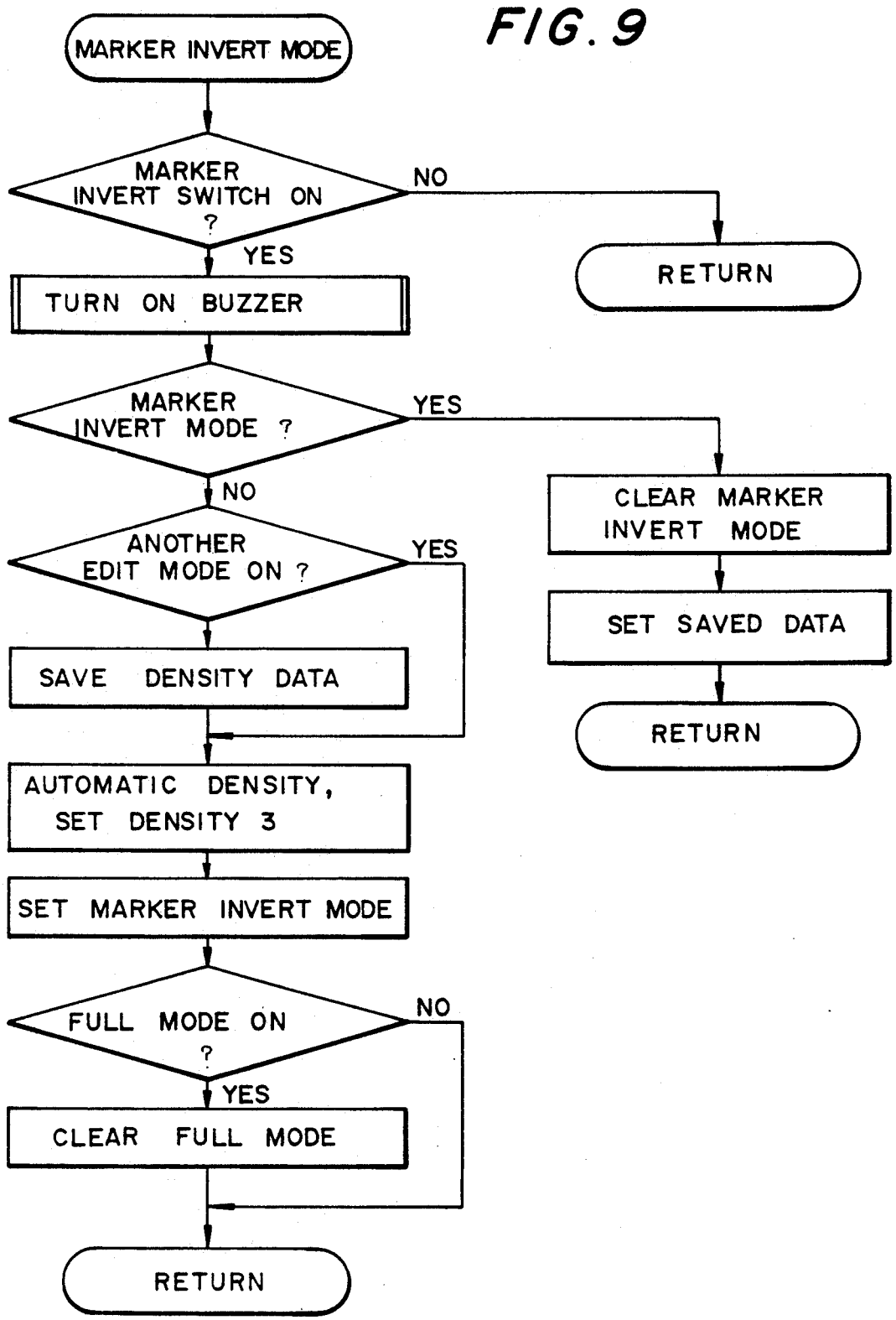
FIG. 9 is a flowchart representative of a maker invert mode.
Figure 10:
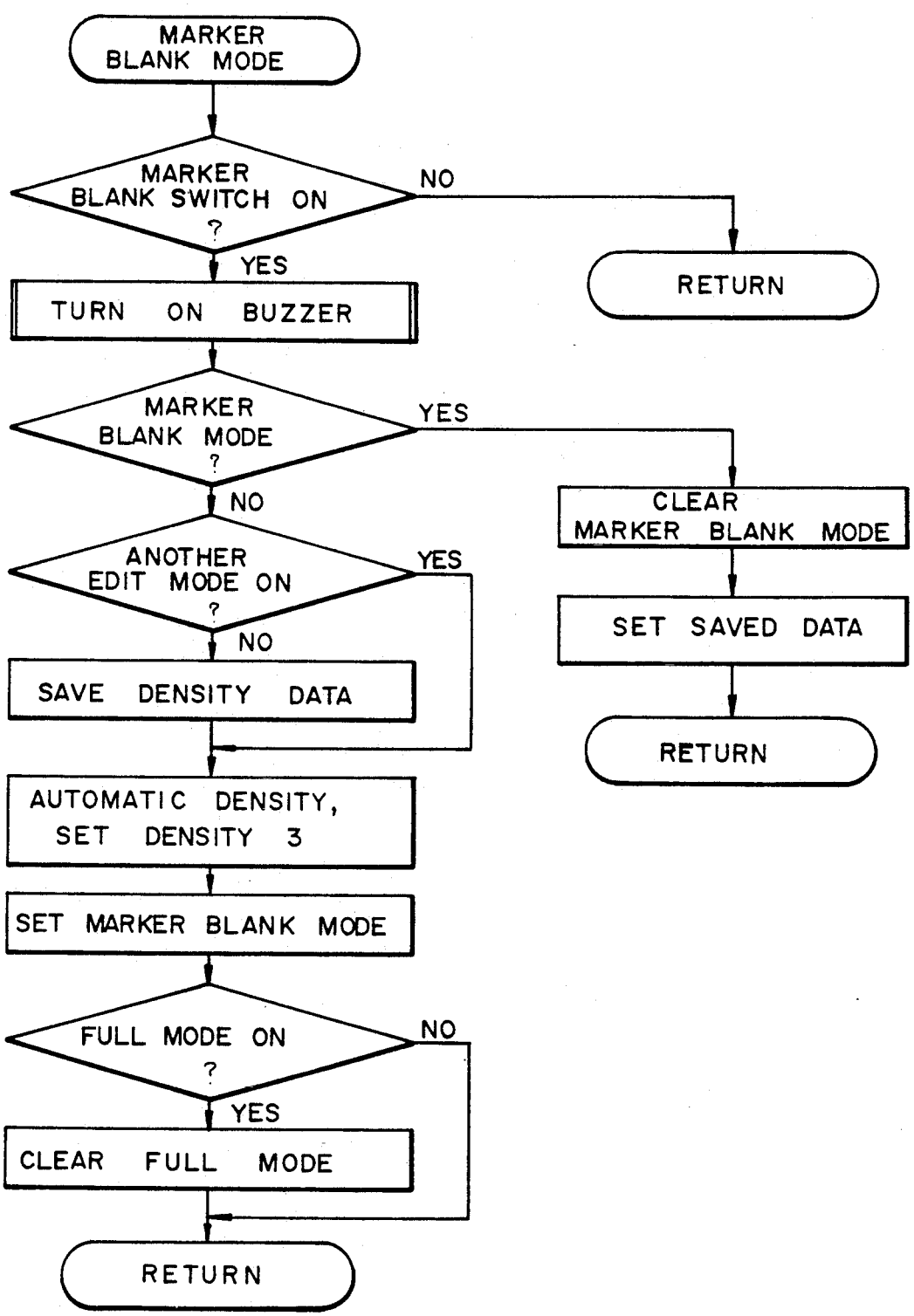
FIG. 10 is a flowchart showing a marker blank mode.
Figure 11:
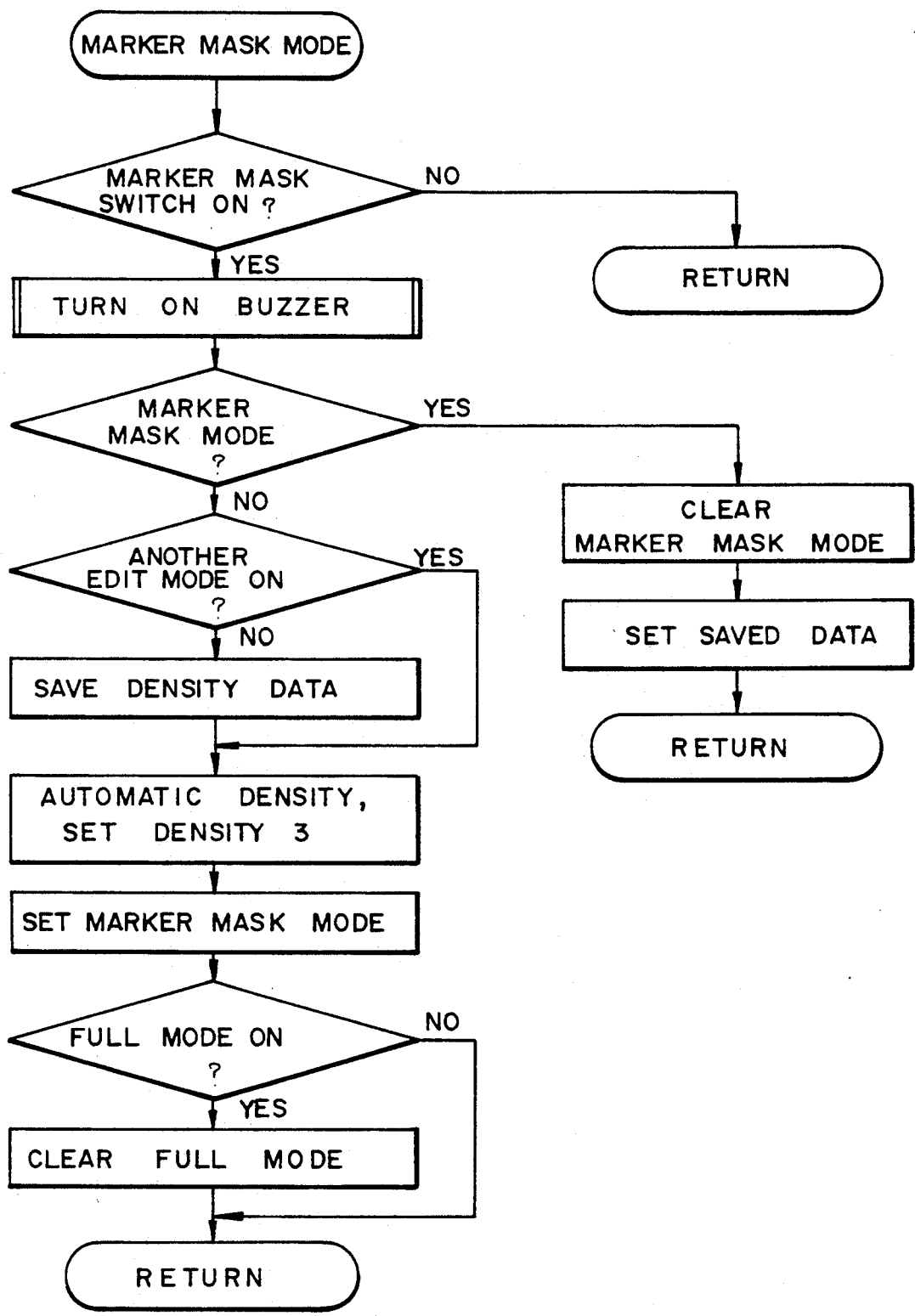
FIG. 11 is a flowchart showing a marker mask mode.
Figure 12:
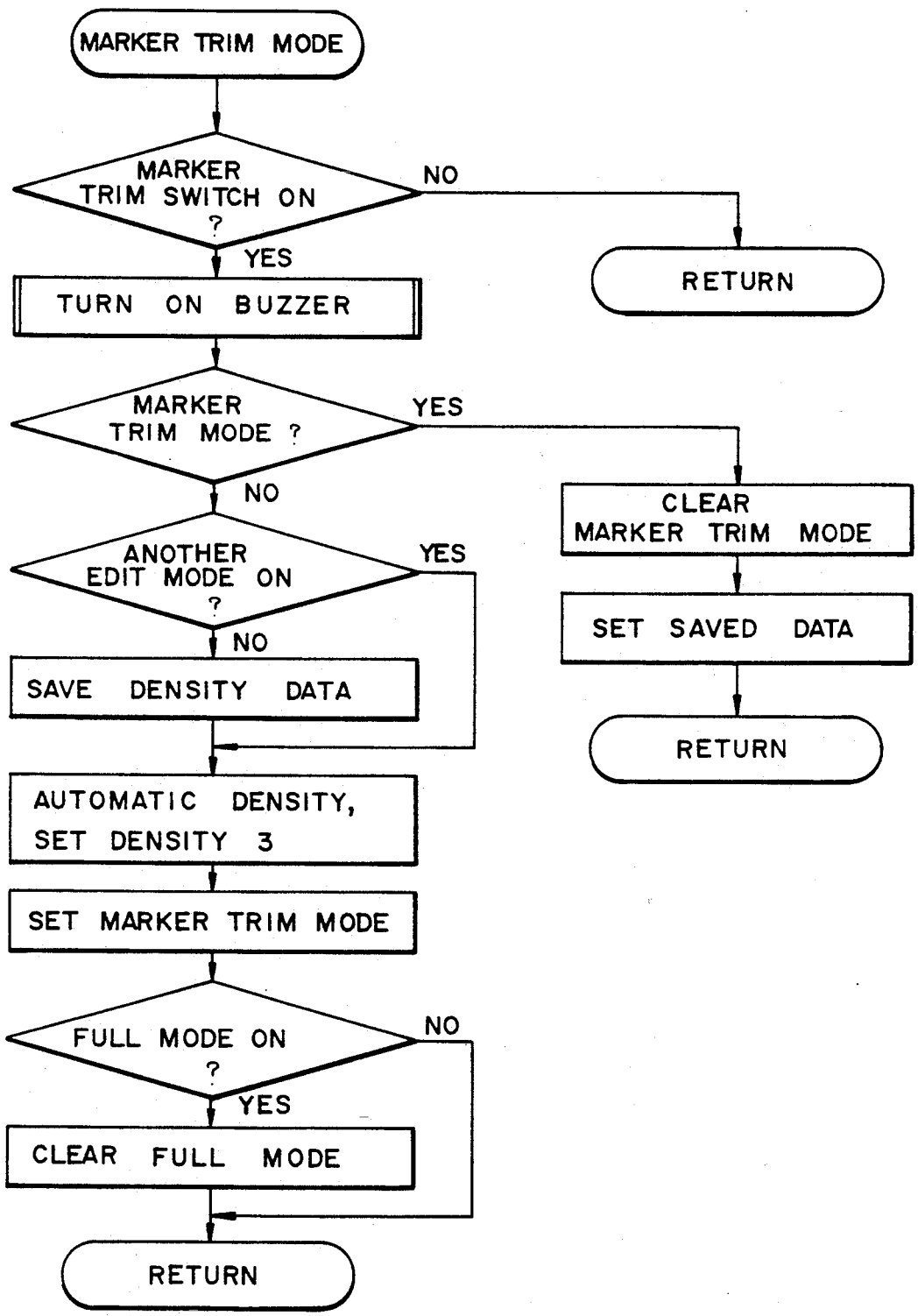
FIG. 12 is a flowchart showing a marker trim mode.

Referring to FIG. 6, a procedure for manually setting density is shown. In the edit mode, the input on the manual density switch is not accepted. When a LIGHT switch is pressed, if the density display has already been turned on, the density is shifted by one notch to the lower density side as represented by an upper part of a condition [1] or an upper paret of a condition [3] which are shown below. If the density display is off, the notch "4 (medium)" is turned on as represented by a left part of a condition [2]. Likewise, when a DARK switch is pressed, density is shifted by one notch to the darker side if the density display is on, and the intermediate notch "4" is turned on if the density display is off.

[1]            ON      ON

□ □ □ □ ■ □   AUTOMATIC DENSITY

ON      OFF

→   □ □ □ □ ■ □   AUTOMATIC DENSITY

[2]            ON

□ □ □ □ □ □   AUTOMATIC DENSITY

ON      OFF

→   □ □ □ ■ □ □ □   AUTOMATIC DENSITY

[3]            ON      OFF

□ □ ■ □ □ □ □   AUTOMATIC DENSITY

ON

→   □ □ □ □ □ □   AUTOMATIC DENSITY

As shown above, even in the automatic density mode, the notch may be manually changed to produce a desired copy.

FIGS. 7 to 12 show various kinds of edit mode setting. As shown in any of the figures, when a switch is pressed, a buzzer is energized. If the particular mode associated with the switch has been set up, that mode is cleared and density data which has been saved at the time of entering into the edit mode is set. If the mode has not been set up, the mode is set up; when the edit mode is set up for the first time, density data before entering into that mode is saved and optimum density for the edit mode is set again (notch "3" in the case of automatic density mode). This is to prevent the trace of a marker from appearing on a copy when the marker is used. Assuming that the subsequent mode is a full-face mode, if a marker mode has been set up, the marker mode is cleared; assuming that the subsequent mode is a marker mode, if a full-face mode has been set up, the full-face mode is cleared. This is because when a marker is to be used for inversion or blanking, it is needless to invert or blank the whole image and because, when the whole image is to be inverted or blanked, it is needless to effect blanking or inversion with a marker.

Figure 13:
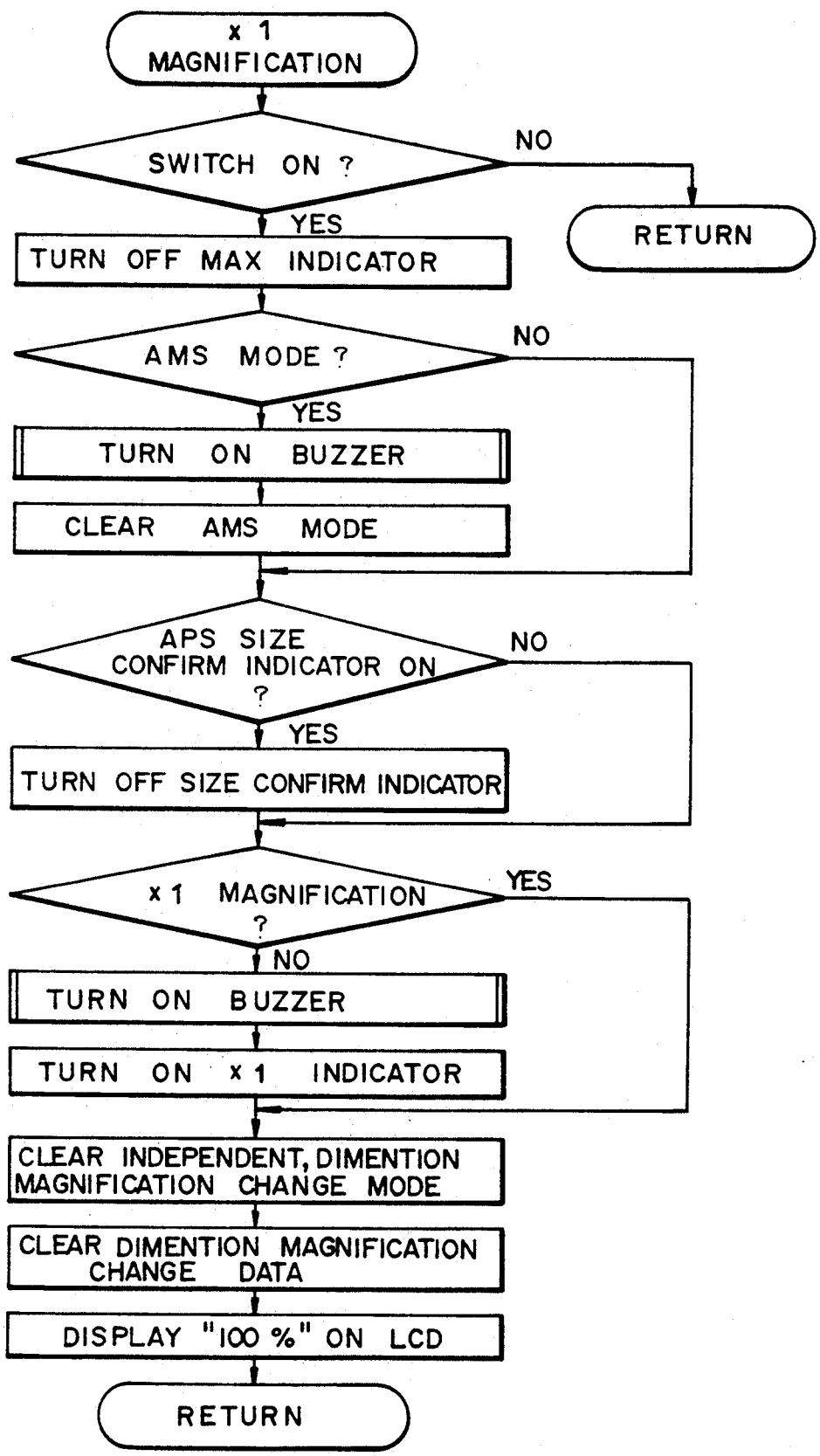
FIG. 13 is a flowchart showing a xl magnify mode.

FIG. 13 shows a flowchart representative of a x1 mode. When a x1 switch is turned on, a MAX and a MIN display each showing data on the basis of independent dimension magnification change are turned off. Simultaneously, if automatic magnification selection (AMS) has been set up, it is cleared; if automatic paper selection (APS) has been set up, it is also cleared. If the x1 magnification mode has already been set up, a buzzer is not energized. Further, an independent and a dimension magnification change mode are cleared, dimension magnification change data (longitudinal and lateral dimensions of a document and those of a paper) are cleared, and "100%" appears on the first line of the LCD.

Figure 14A:
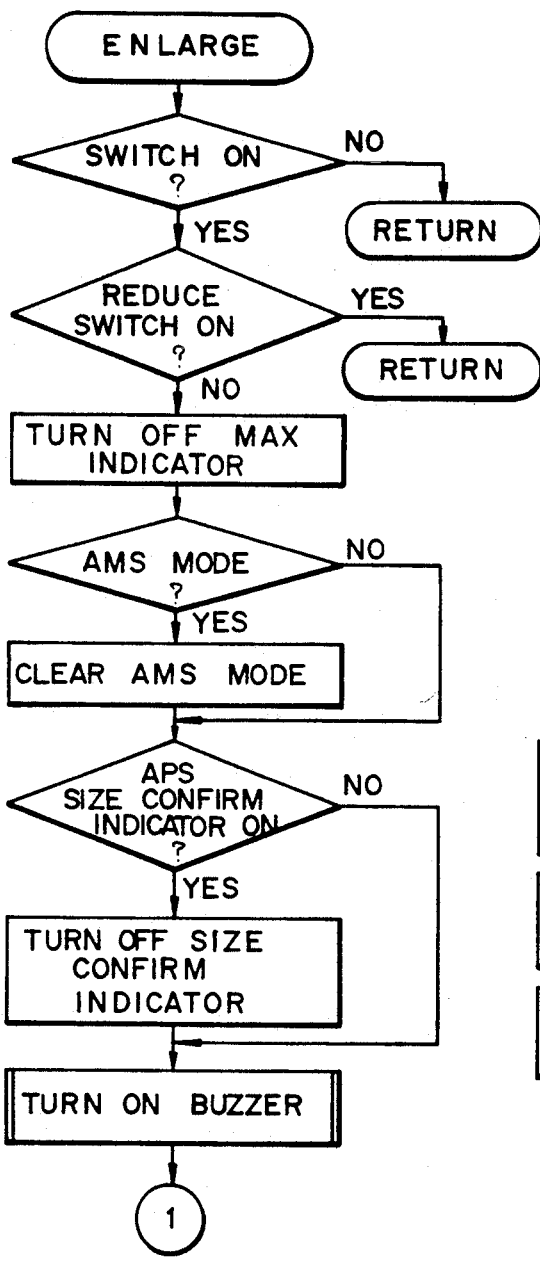
FIG. 14a is a flowchart showing an enlarge mode.
Figure 14B:
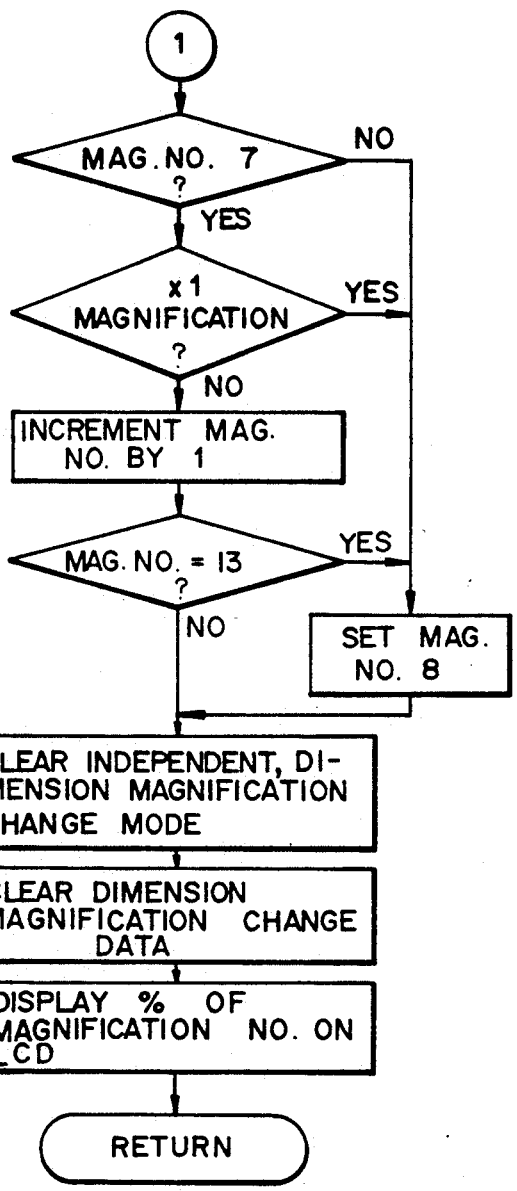
FIG. 14b is a flowchart showing a relationship between magnification Nos. and magnifications.

FIG. 14a shows a procedure representative of an enlarge mode. When a reduce mode is turned on simultaneously with the manipulation of an enlarge switch, no operation occurs. As in the case of the x1 mode, AMS and APS processings are executed to energize the buzzer. When the magnification is x1, reduction, independent longitudinal and lateral magnification or zoom 400%, "115%" is set; otherwise, a magnification higher by one step than the fixed magnification being displayed is set. The independent mode and the dimension magnification change mode are cleared, and the dimension magnification change data are erased. At this time, a magnification such as "115%" appears on the first line of the LCD. FIG. 14b shows a relationship between magnification Nos. which are shown in the flowcharts and the magnifications.

Figure 15:
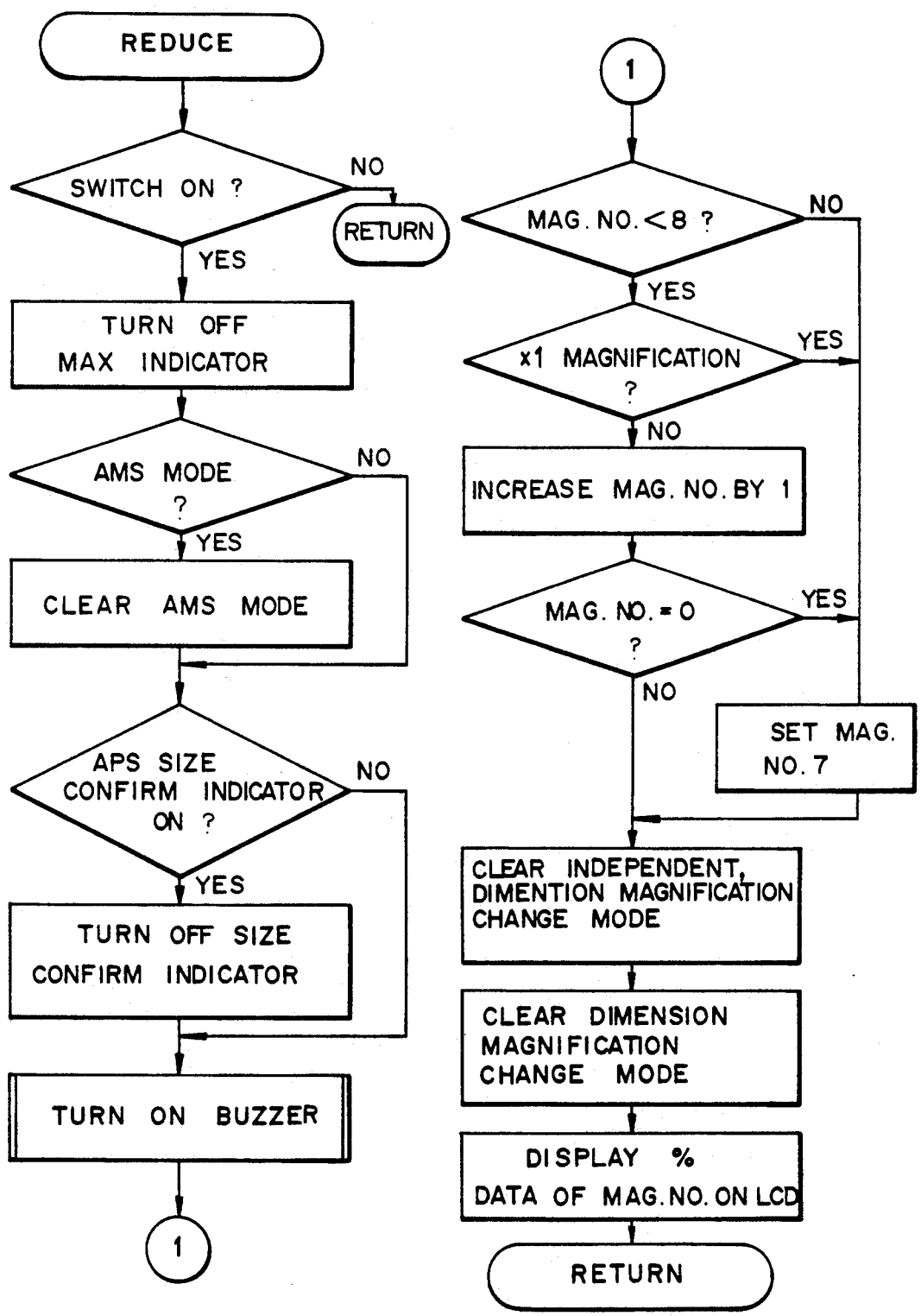
FIG. 15 is a flowchart representative of a reduce mode.

FIG. 15 is a flowchart demonstrating a reduce mode. When the magnification is x1, independent longitudinal and lateral magnification, zoom 25%, "93%" is set; otherwise, a magnification lower by one step than the fixed magnification being displayed is set. The rest of the procedure is the same as in the enlarge mode.

Figure 16A:
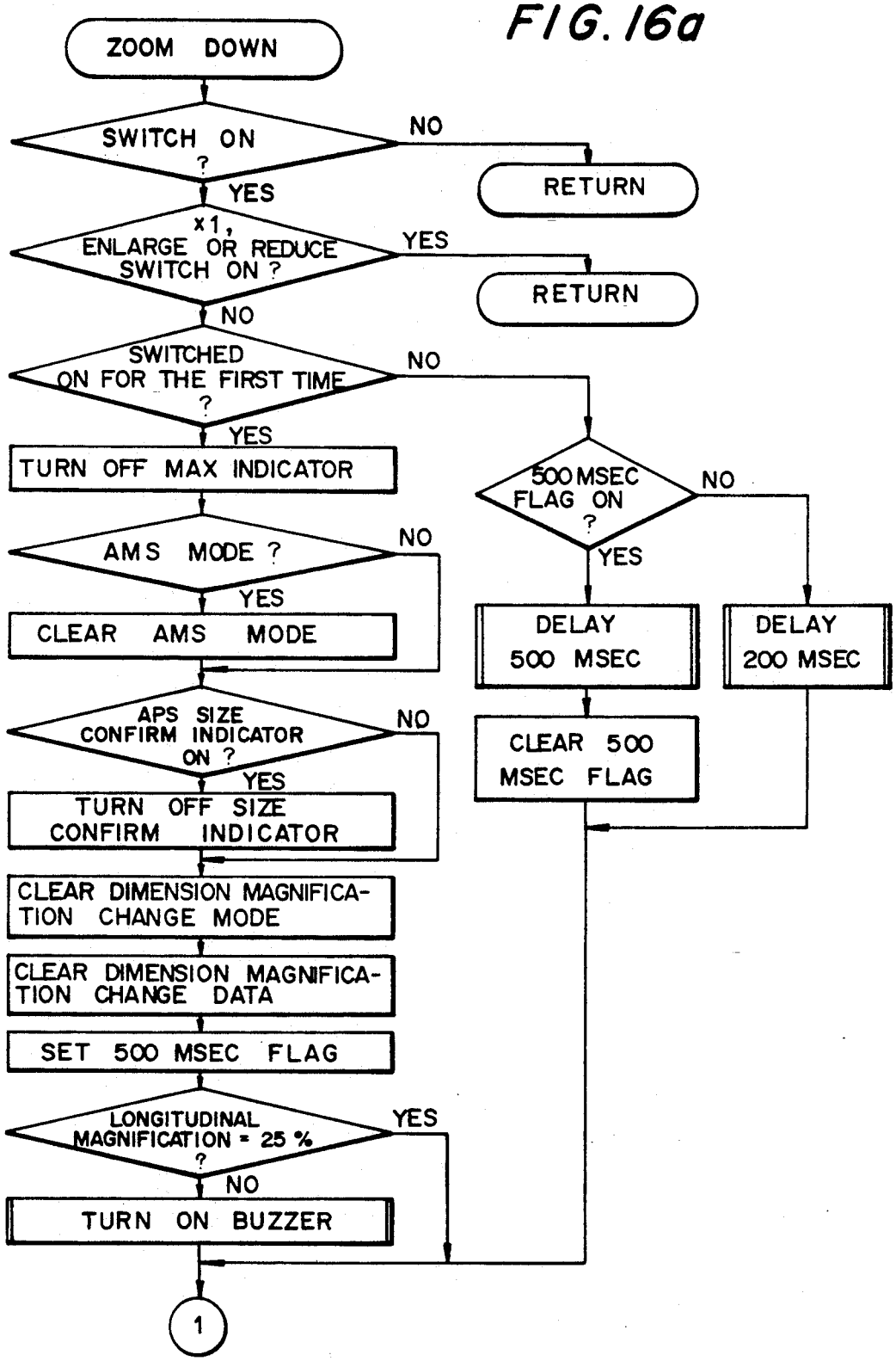
FIGS. 16a and 16b are flowcharts demonstrating a zoom down mode.
Figure 16B:
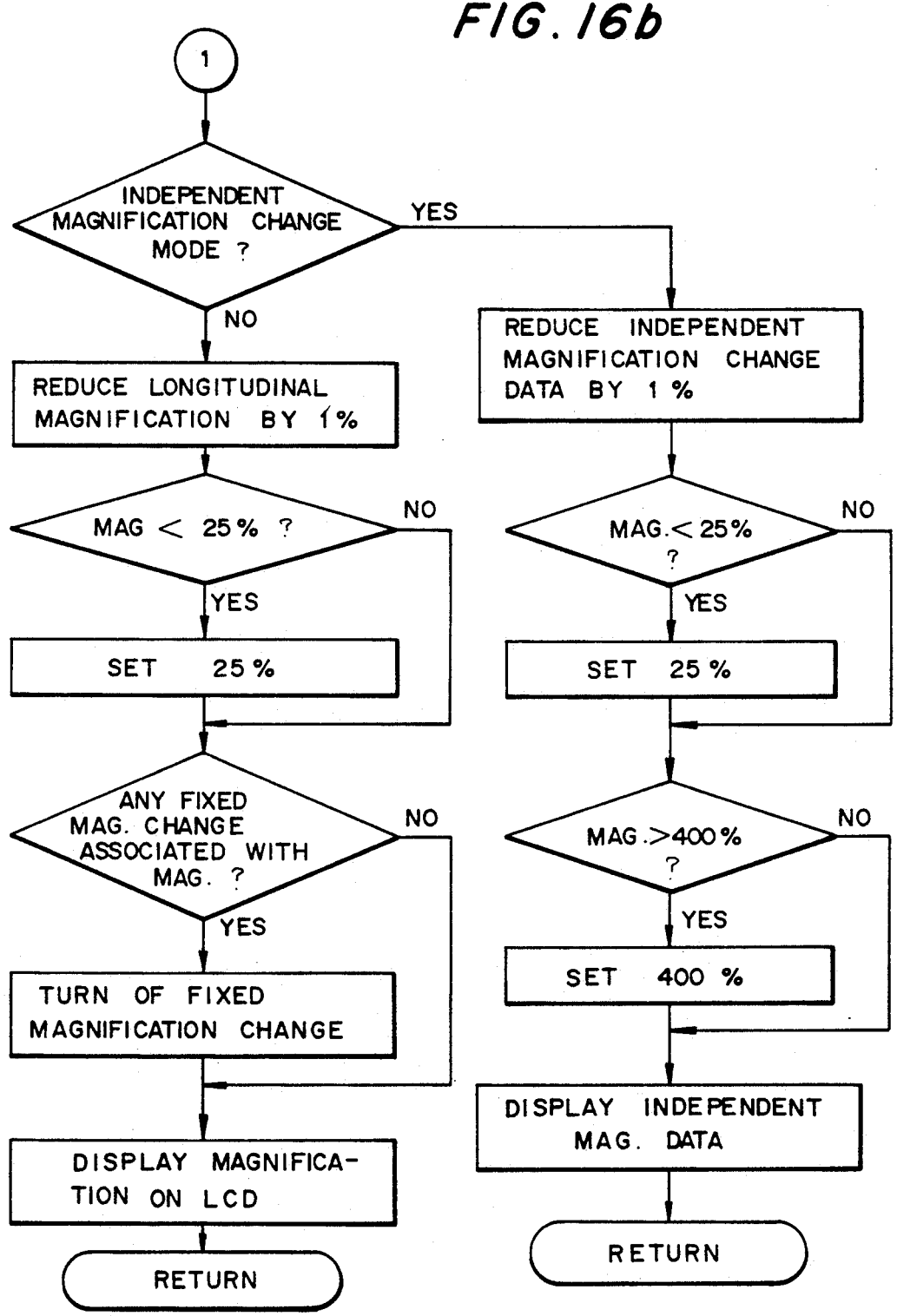

FIGS. 16a and 16b are flowcharts showing a zoom down (−) mode. When any of the enlarge, reduce and x1 keys are pressed, the operation of the zoom key is not accepted. When the zoom key is pressed for the first time, AMS and APS processings are effected to clear the dimension magnification change mode as well as dimension magnification change data. A 500 msec flag is set and, if the magnification is 25%, the buzzer is not energized. In the case of a mode other than the independent magnification change mode, the magnification is reduced by 1%. If fixed magnification change which corresponds to the resulting magnification exists, a fixed magnification change display associated therewith is turned on. The magnification such as "91%" is indicated on the first line of the liquid crystal display. Here, the display may be provided in any of three different manners as shown below:

| (1) 1st Line | 100% → 99% |
|---|---|
| (2) Long. 125% | Lat. 90% → 124% |
| (3) | → 89% |

The method (1) shown above is used to zoom down when the independent magnification change mode is not set up. When the zoom key is pressed while the independent magnification change mode is set up, the method (2) is adopted for zooming down by using the longitudinal dimension as a reference, resetting the independent magnification change, and setting up the usual magnification change mode. The method (3) is adapted to zoom down by using the lateral dimension as a reference.

Although not shown in the flowcharts, a method which zooms down in both of the longitudinal and lateral directions is available in the independent magnification mode, as shown below:

| (4) Long. 125% Lat. 90% → Long. 124% Lat. 89% |
|---|

The method (4) is extremely effective when a person sets up a magnification in the independent magnification change mode or the dimension magnification change mode, then obtains copies, and then desires to slightly change the magnification.

The zooming methods (2), (3) and (4) available in the independent magnification mode are memorized by a dip switch, a memory back-up, etc. In the independent magnification change mode, the independent magnification data are sequentially reduced. Specifically, when a magnification of less than 25% is set (in this particular mode, magnification data can be set by using the numeral keys and zoom key), a magnification of 25% is set; when a magnification of more than 400% is set, a magnification of 400% is set.

| Long. 125% | Lat. 90% | → Long. 124% Lat. 90% |
|---|---|---|
| Lat. Mag. Set | 90% | Lat. Mag. Set 89% |
| | ↑ flash | ↑ flash |

As the zoom key is continuously pressed, the buzzer is energized at the first time and the first zoom-down is effected at 500 msec, and the buzzer is deenergized at the second time and onward and the zoom-down is effected at 200 msec.

Figure 17A:
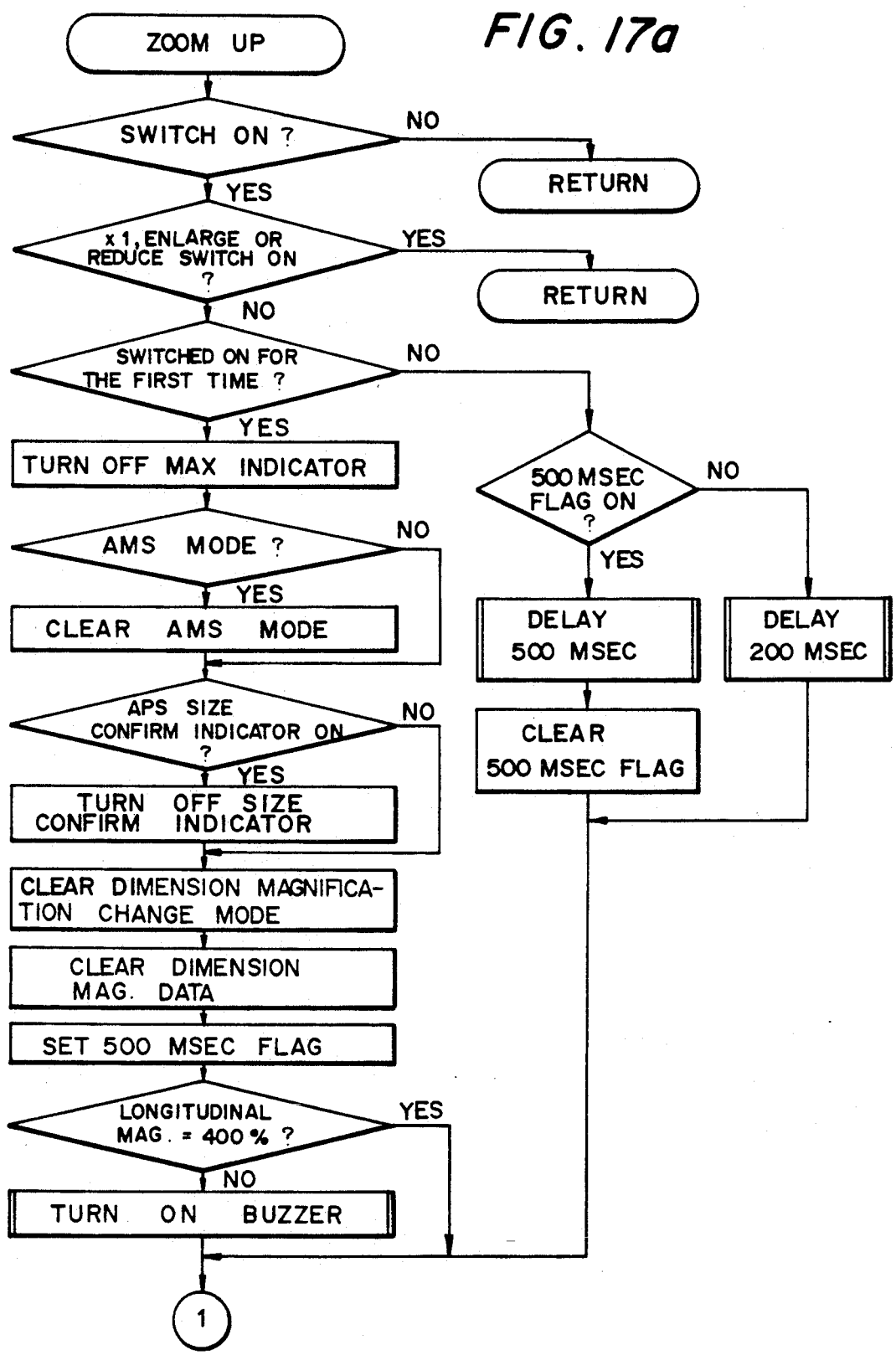
FIGS. 17a and 17b are flowcharts demonstrating a zoom up mode.
Figure 17B:
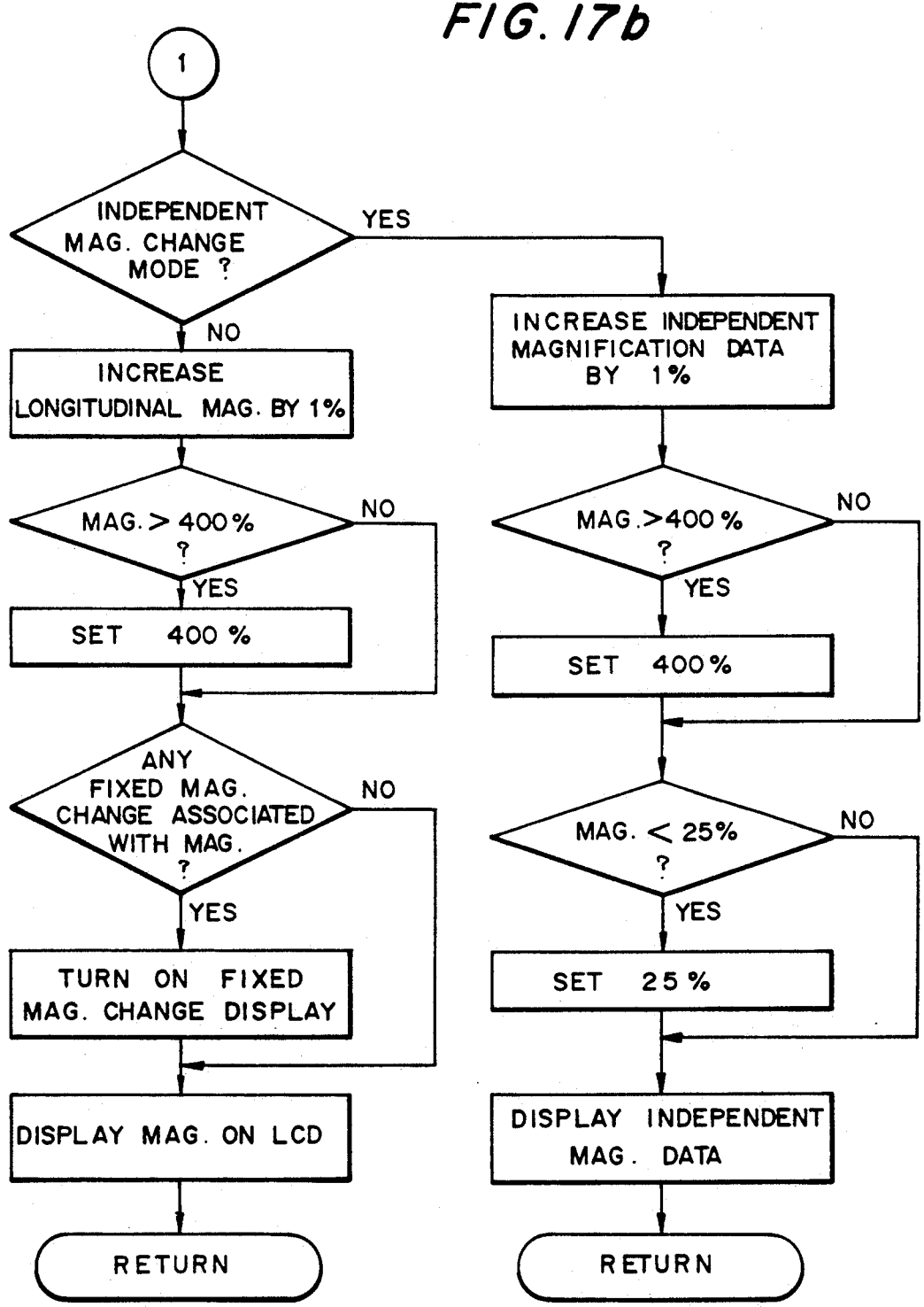

FIGS. 17(a) and 17(b) are flowcharts showing a zoom up (+) mode. This mode is basically the same as the zoom down mode of FIG. 16 and, therefore, details thereof will not be described to avoid redundancy.

Figure 18:
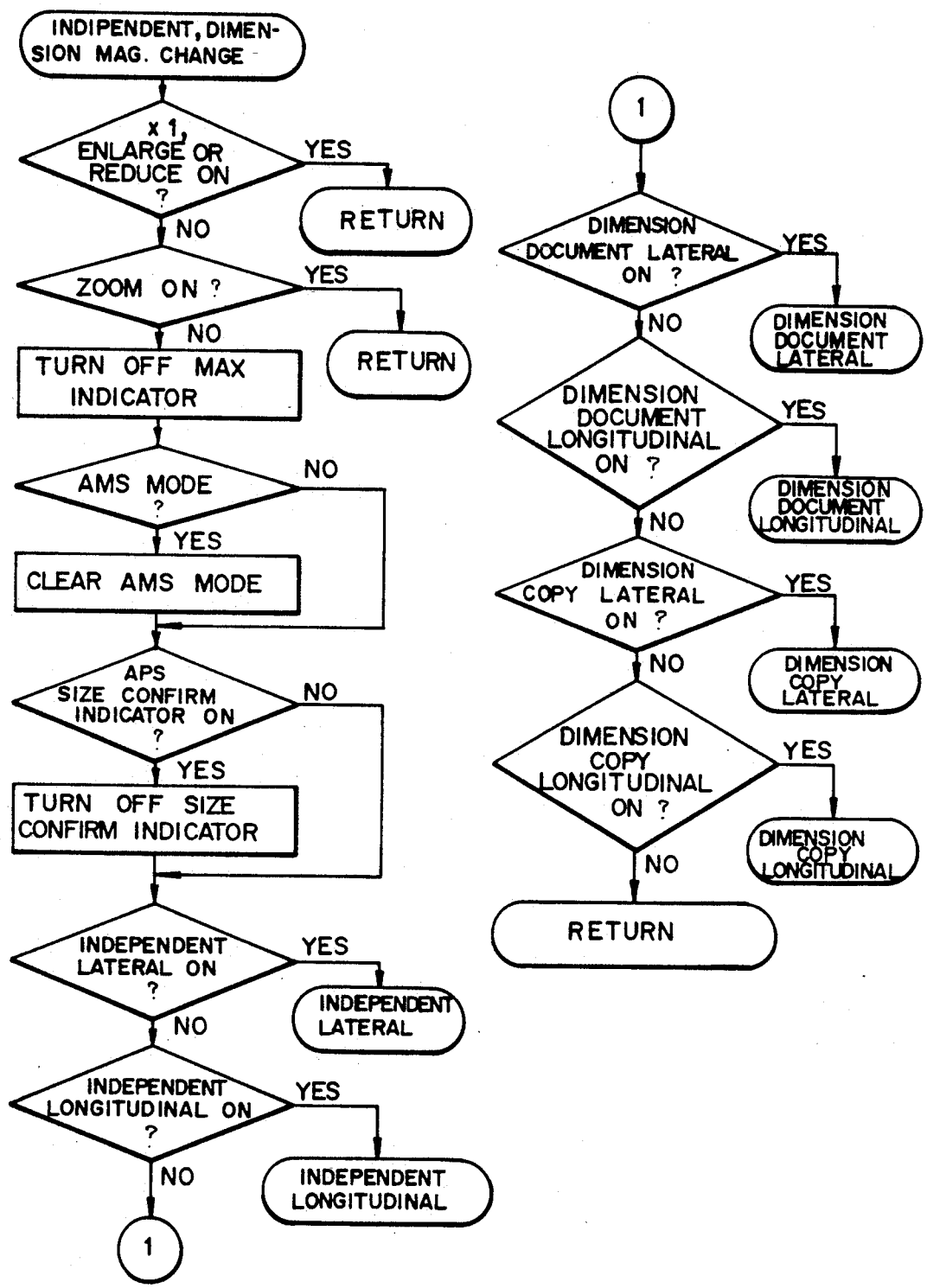
FIG. 18 is a flowchart showing an independent dimension magnification change mode.

FIG. 18 shows an independent or a dimension magnification change mode. As shown, even when any of the independent and dimension magnification change switches is pressed, the input is not accepted if any of the x1, enlarge, reduce and zoom switches has been depressed.

Figure 19:
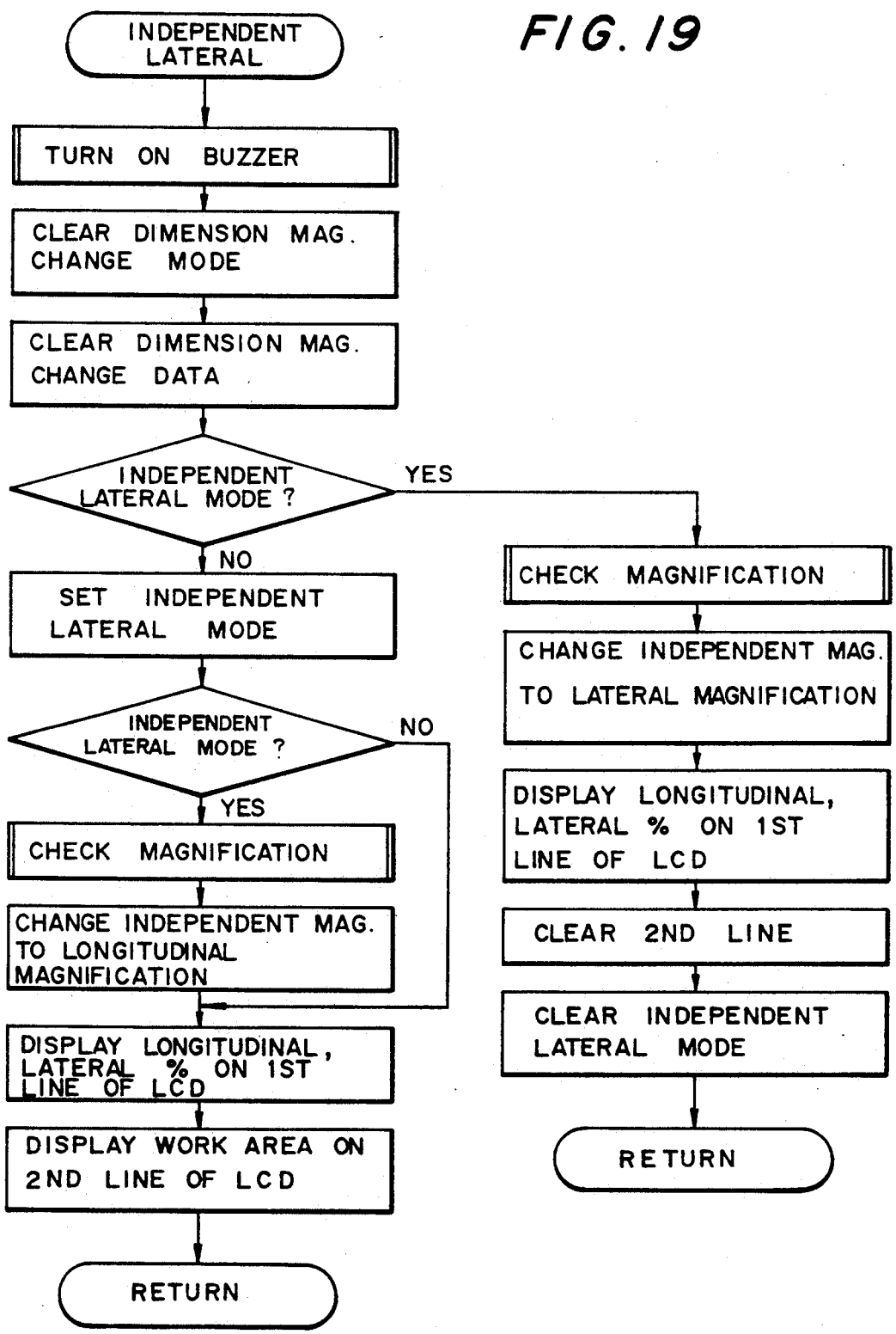
FIG. 19 is a flowchart showing an independent longitudinal mode.

FIG. 19 shows an independent lateral mode. Specifically, when the independent lateral switch is pressed, the dimension magnification change mode as well as data associated therewith is cleared. If the independent lateral mode has already been set up, the magnification is checked. If the independent magnification change data is greater than 400%, 400% is set while, at the same time, the MAX indicator is turned on. If it is smaller than 25%, 25% is set, the MIN indicator is turned on, the independent magnification is set as the lateral magnification, and the longitudinal and lateral magnifications are displayed on the first line of the LCD.

| Long. 100% | Lat. 100% | → Long. 100% Lat. 86% |
|---|---|---|
| Lat. Mag. Set | 68% | |
| | ↑ flash | |

If the current mode is not the independent lateral magnification change mode, the mode is set. If the independent longitudinal magnification change mode has been set up, the independent magnification is set as the longitudinal magnification and then the independent lateral magnification mode is set up.

| (1) | | 100% | → Long. 100% | Lat. 100% |
|---|---|---|---|---|
| | | | | ↑ flash |
| (2) Long. 150% Lat. | | 210% | → Long. 150% | Lat. 210% |
| | | | Lat. Mag. Set | 210% |
| (3) Long. 150% Lat. | | 210% | → Long. 167% | Lat. 210% |
| Long. Mag. Set | | 167% | Lat. Mag. Set 210% | |

The condition (1) shown above exemplifies a case wherein the usual magnification change mode is replaced with the independent lateral magnification change mode. The condition (2) exemplifies a case wherein the independent magnification change mode is replaced with the independent lateral magnification change mode. Further, the condition (3) exemplifies a case wherein the independent longitudinal magnification change mode is replaced with the independent lateral magnification change mode.

As stated above, in the independent magnification change mode, a work area is provided for setting a magnification other than the current longitudinal and lateral magnifications, and the indicator associated with the desired magnification is caused to flash. This allows a person to compare the desired magnification and the current magnification and, in addition, facilitates the recognition by the flashing of the magnification data. Further, since the magnification data may be entered by using the zoom key in place of the numeral keys, fine adjustment and easy operation are achieved.

The independent magnification data in the work area will be set as the longitudinal magnification or the magnification at any of the following exemplary timings:

(1) when the same key is pressed, i.e., when data is set in the independent lateral magnification change mode and then the independent lateral magnification change key is pressed again;

(2) when any other independent magnification change key is pressed, i.e., when data is set in the independent longitudinal magnification change mode and then the independent lateral magnification change key is pressed to set the longitudinal data;

(3) when the enter key (# key) is pressed; and (4) when the print switch is depressed.

Figure 20:
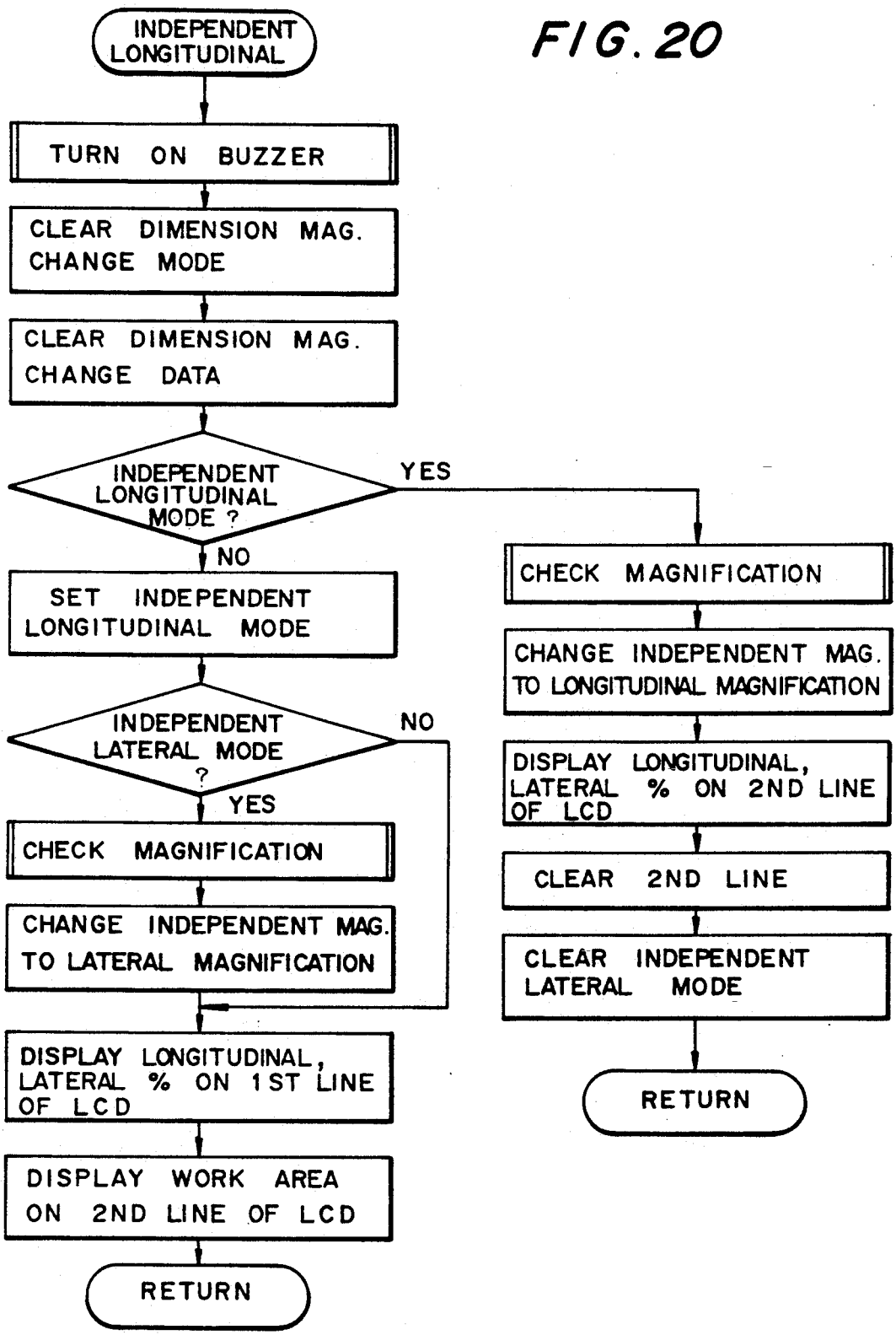
FIG. 20 is a flowchart showing an independent lateral mode.

FIG. 20 shows an independent longitudinal mode which is essentially the same as the independent lateral mode of FIG. 19 and, hence, details thereof will not be described.

Figure 21:
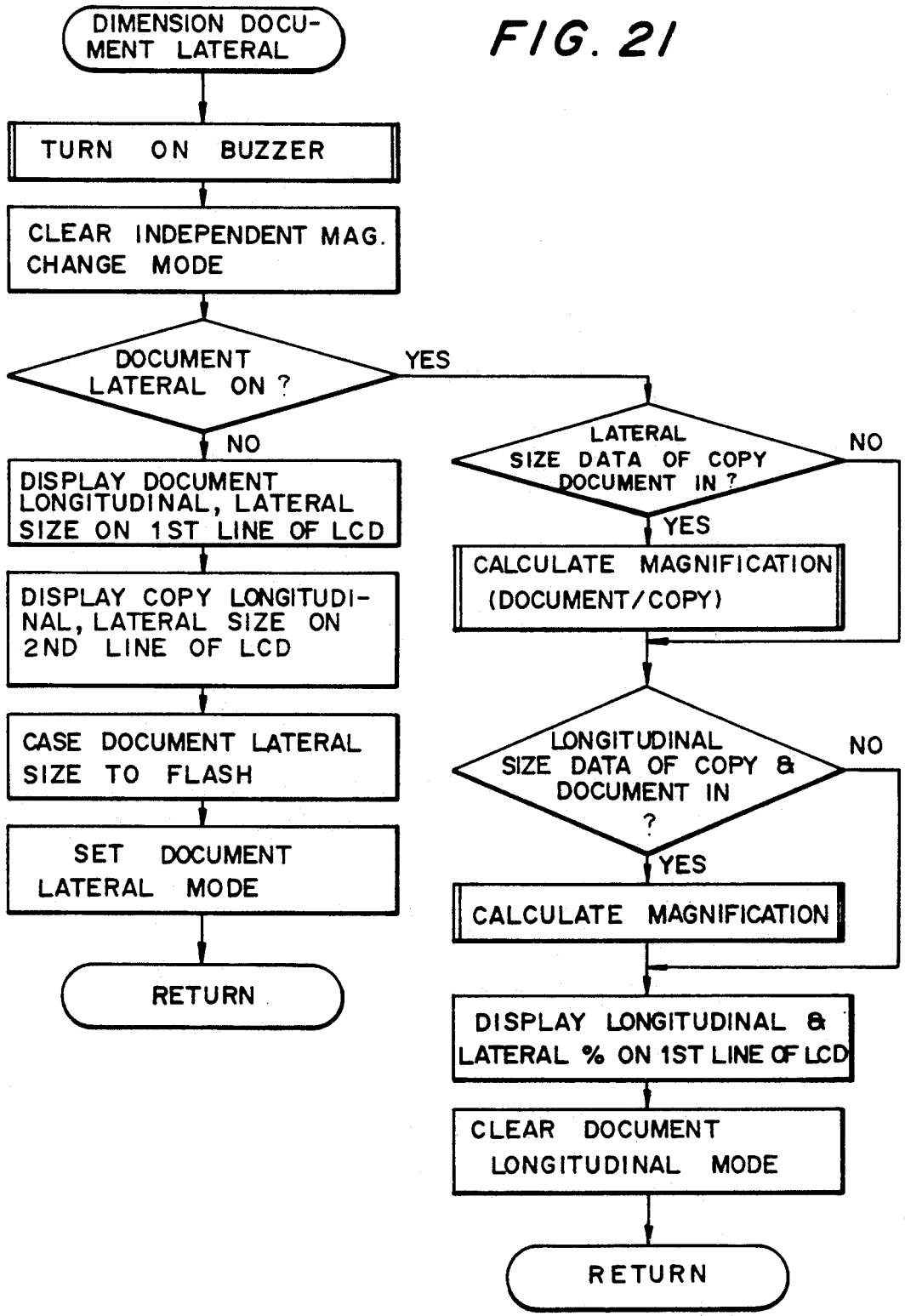
FIGS. 21 to 25 are flowcharts each showing a dimension magnification change mode is a flowchart showing a dimension document lateral mode.
Figure 22:
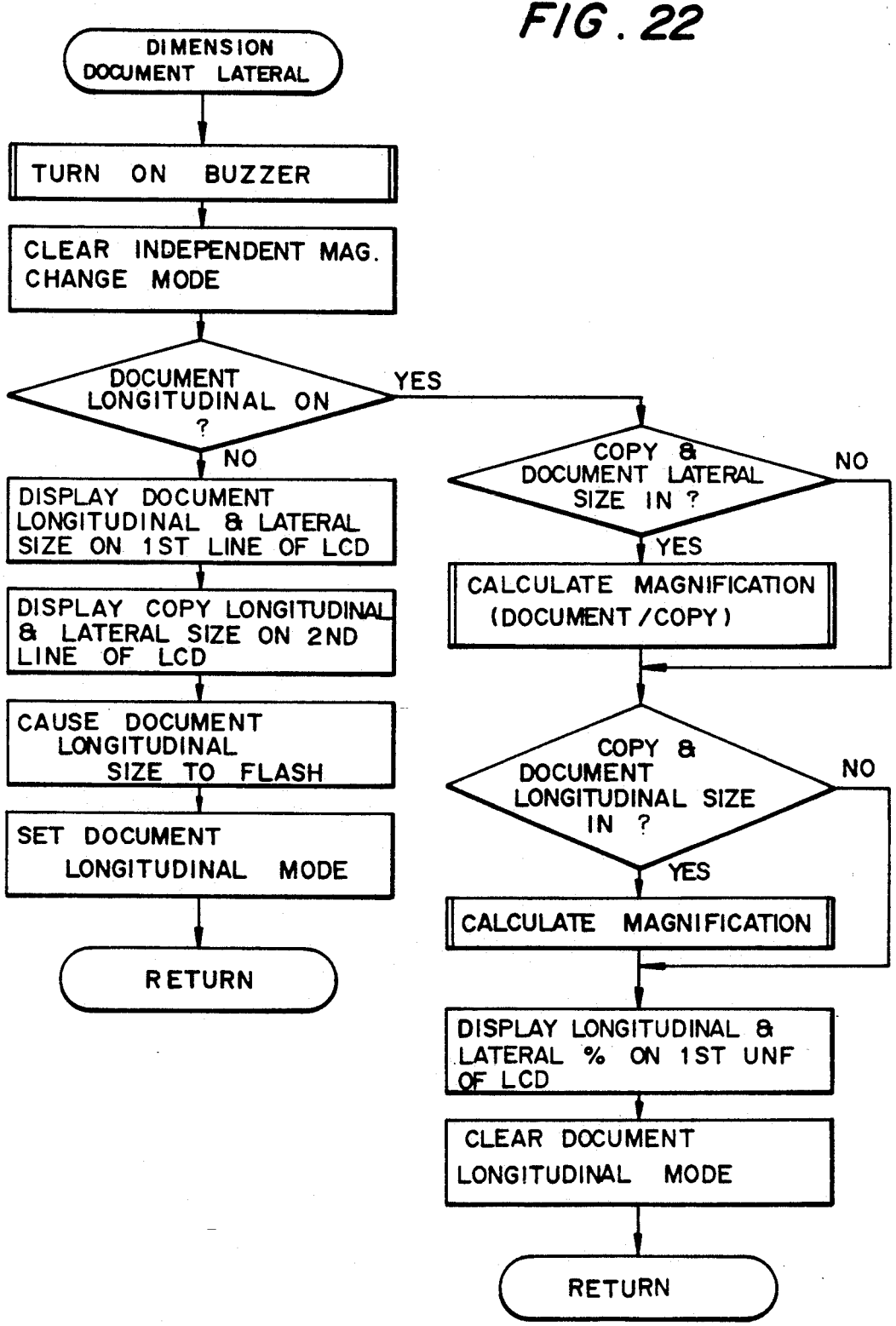
Figure 23:
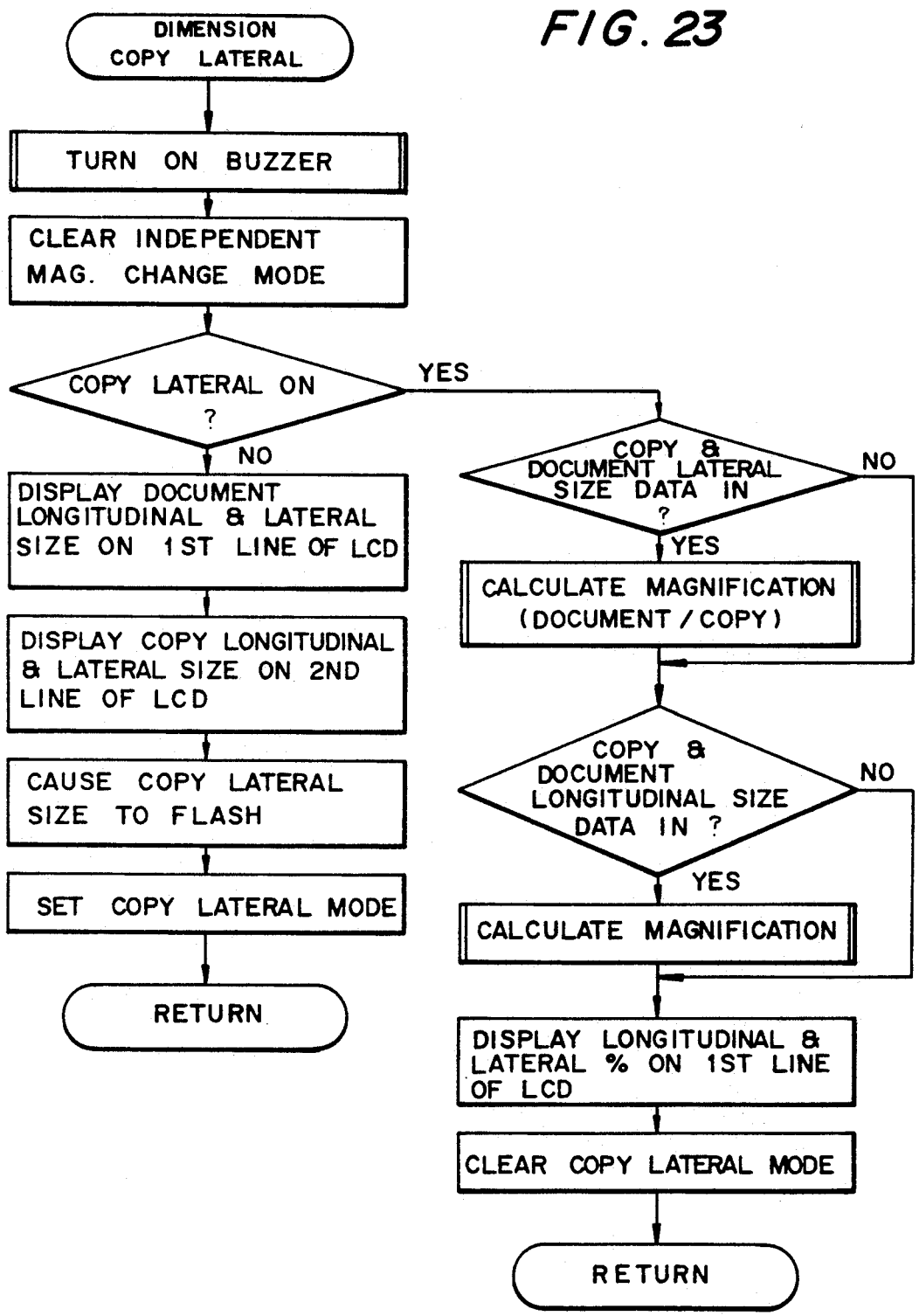
Figure 24:
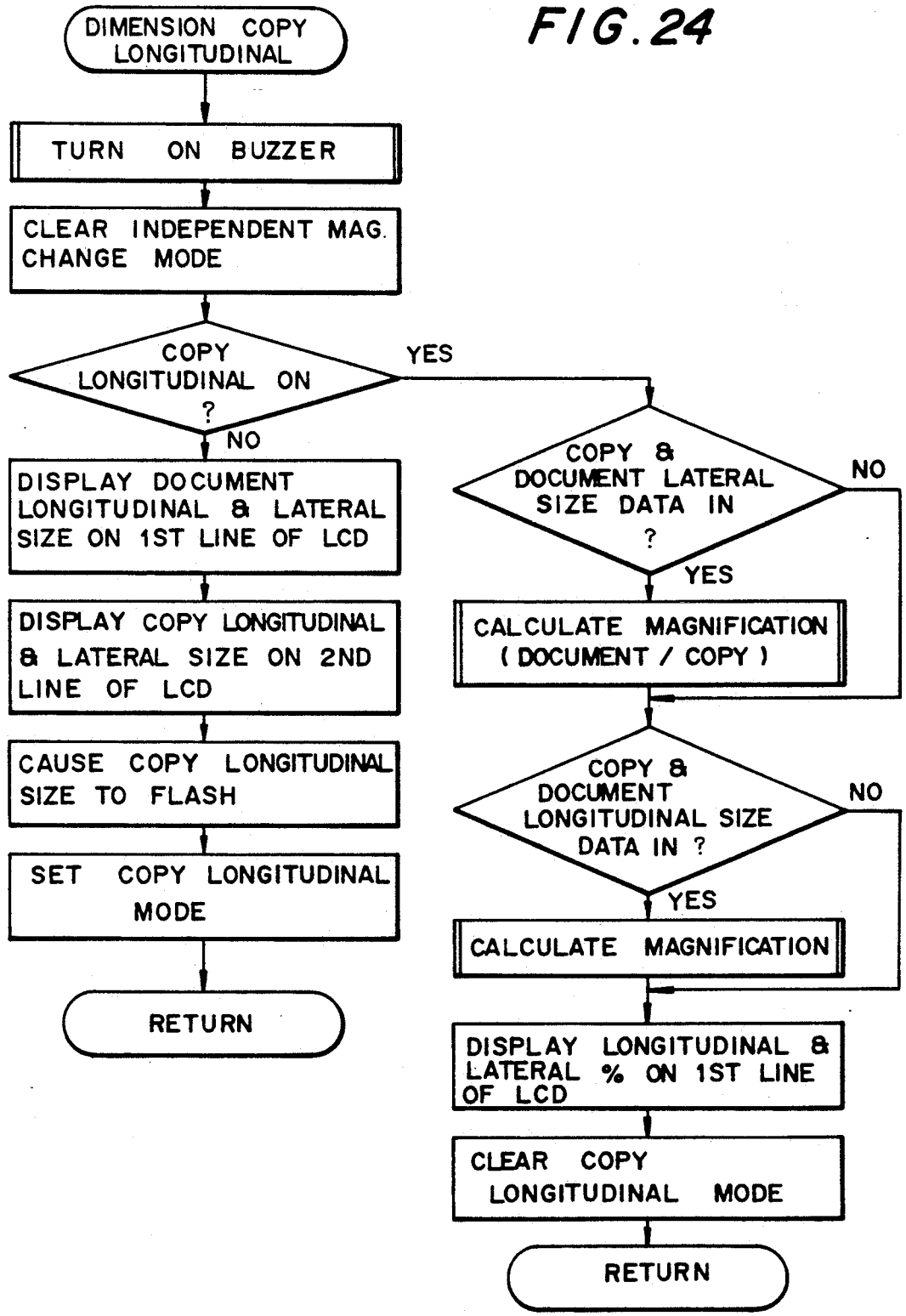
Figure 25:
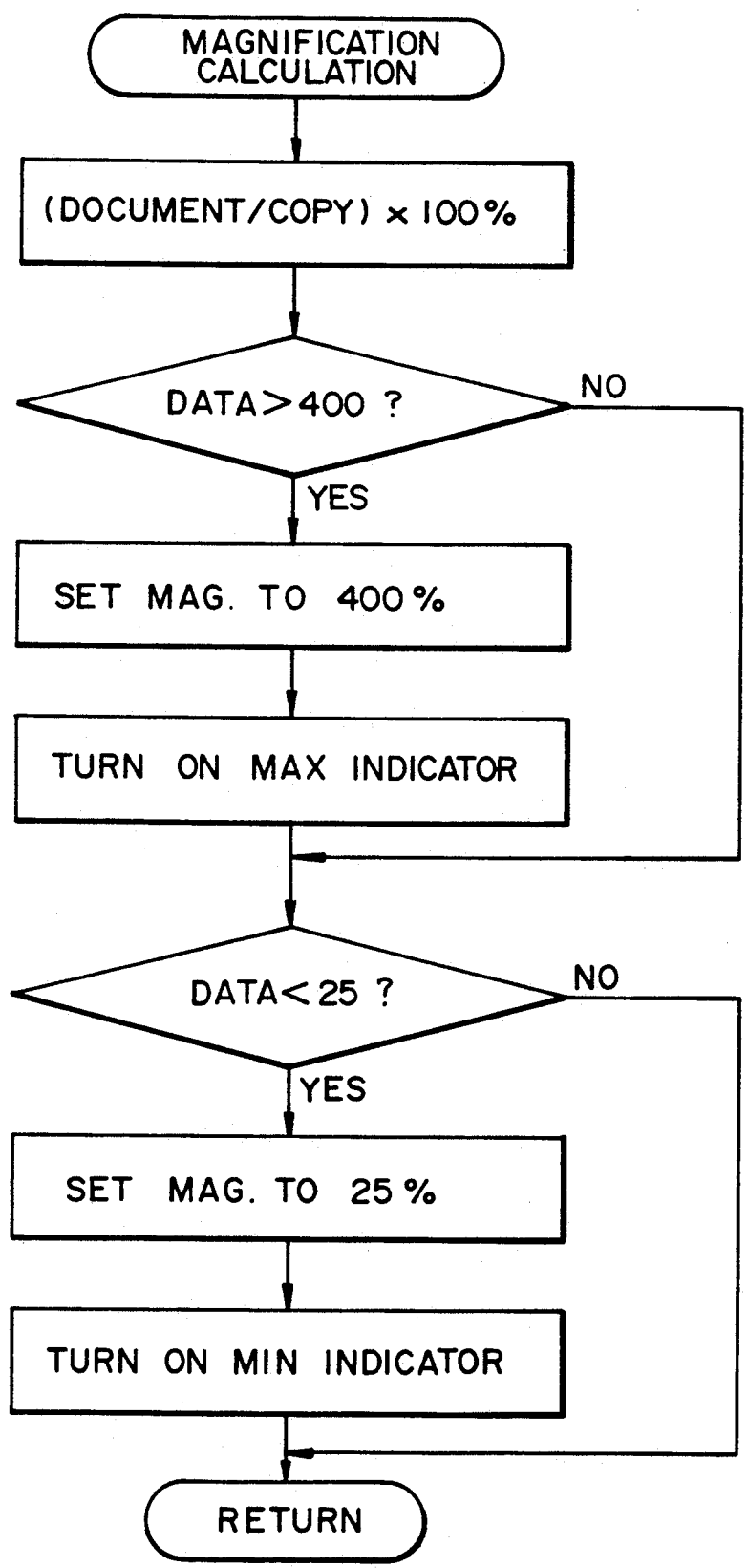

FIGS. 21 to 25 are flowcharts each showing a dimension magnification change mode. Specifically, FIG. 21 shows a dimension document lateral mode. In this mode, when the dimension document lateral switch is pressed, the independent magnification change mode is cleared. If the document lateral input mode has been set up, whether the lateral dimension of a copy and that of a document have been entered is checked. If they have been entered, a longitudinal magnification is calculated and set. Thereafter, the longitudinal and lateral magnifications are displayed on the first line of the LCD. If the longitudinal and lateral dimensions have not been entered, a magnification before the dimension magnification change is displayed because any magnification cannot be calculated.

(1) Exemplary case wherein the longitudinal and lateral dimensions are entered

| document | long. 98 mm | lat. 100 mm |
|---|---|---|
| copy | long. 50 mm | lat. 120 mm |
| then, | | |
| long. mag. 51% lat. mag. 120% | | |

(2) Exemplary case wherein only the lateral dimensions of a copy and a document are entered (assuming that the previous magnification is 100%)

| document | long. 98 mm | lat. 100 mm |
|---|---|---|
| copy | long. | lat. 120 mm |
| then, | | |
| long. mag. 100% lat. mag. 120% | | |

When the dimension document lateral input mode is not set up, the mode is set; when any size data is preserved, the size data is displayed; and when no such data is preserved, dots "..." are displayed and caused to flash.

(1) Exemplary case wherein no size data is entered

| document | long. | mm | lat. ...... mm |
|---|---|---|---|
| copy | long. | mm | lat. mm |

Here, the dots "..." indicative of a document lateral size flash.

(2) Exemplary case wherein previously entered size data are preserved

| document | long. | 98 mm | lat. 100 mm |
|---|---|---|---|
| copy | long. | 50 mm | lat. 120 mm |

Here, "100" indicative of the document lateral dimension flashes.

As described above, when any one of the document longitudinal and lateral and the copy longitudinal and lateral keys is pressed, all the data are displayed and recognizable with ease. Further, if data has already been entered, dots "..." flash to show a person particular data being entered. These dimension size data will be erased only when a magnification change key other than the dimension magnification change keys is depressed and in the event of automatic resetting. For example, after a person has entered the dimensions and then operated the copier to produce a copy, he or she can readily change the dimensions by looking at the size data being preserved.

The longitudinal and lateral magnifications will be calculated at any of the following timings:

(1) when the same key is pressed again;

(2) whe the enter key (# key) is pressed; and (3) when the print switch is pressed.

In summary, it will be seen that the present invention provides a system which allows a person to readily enter required data in a magnification change mode operation of a copier.

Various modifications will become possible for those skilled in the art after receiving the teachings of the present disclosure without departing from the scope thereof.

What is claimed is:

1. In a magnification changing system for a copier, the improvement:

wherein in an independent longitudinal and lateral magnification change mode of said copier and longitudinal magnification and a lateral magnification are displayed when said longitudinal and lateral magnifications are independently set, an exclusive area is provided for setting a magnification other than the longitudinal and lateral magnifications being displayed and wherein said magnification ratio in both the longitudinal and lateral directions are automatically computed independently from each other and are computed at least in part from a manual input which indicates the input size in both the longitudinal and lateral directions of the area to be copied and an output size desired in longitudinal and lateral directions;

means for storing said computed magnification ratios for later use; and means for manually and numerically inputting the dimensions of the original and the size of the desired copied output.

2. The improvement as claimed in claim 1, wherein data displayed in the exclusive area or an underline is caused to flash.

3. The improvement as claimed in claim 1, wherein when a longitudinal and a lateral key is pressed in a dimension magnification change mode, the dimension magnification change mode is cleared.

4. The improvement as claimed in claim 1, wherein when any particular key is depressed simultaneously with a zoom key, an enlarge key, a reduce key or a x1 key, priority is given to said particular key.

5. The improvement as claimed in claim 1, wherein a magnification is entered by using numeral keys or a zoom key.

6. The improvement as claimed in claim 1, wherein data is set when the same key is pressed again, when another independent magnification change key is pressed, or when a start key is pressed.

7. The improvement as claimed in claim 6, wherein when the data set is greater than a maximum value of magnification change or smaller than a minimum value, said maximum value or said minimum value is selected as data while, at the same time, a warning is produced.

8. The improvement as claimed in claim 1, wherein when an enlarge key is pressed, all the fixed magnification changes and magnifications available in an enlarge mode are displayed and, when a reduce key is pressed, all the fixed magnification changes and magnifications available in a reduce mode are displayed.

9. The improvement as claimed in claim 8, wherein in the event of usual magnification change only magnifications are displayed and, in the event of an independent magnification change, a longitudinal and a lateral magnification are displayed.

10. The improvement as claimed in claim 9, wherein when the lateral and longitudinal magnification differs from the fixed magnifications all the displays are turned off.

11. The improvement as claimed in claim 8, wherein when the same magnification as any of the fixed magnification changes is reached during zooming up or zooming down, all the fixed magnification changes (reduction or enlargement) and magnifications are displayed.

12. The improvement as claimed in claim 10, wherein when the lateral and longitudinal magnification differs from the fixed magnifications all the displays are turned off.

13. The improvement as claimed in claim 10, wherein when zoom-up or zoom-down is effected at the time of an independent magnification change, the independent magnification change mode is cleared with the longitudinal magnification as a reference.

14. The improvement as claimed in claim 10, wherein when zoom-up or zoom-down is effected at the time of an independent magnification change, the independent magnification change mode is cleared with the lateral dimension as a reference.

15. The improvement as claimed in claim 10, wherein when zoom-up or zoom-down is effected at the time of independent magnification change, both the longitudinal and lateral dimensions are increased or decreased.

16. The improvement as claimed in claim 10, wherein when zoom-up or zoom-down is effected at the time of independent magnification change, the independent magnification change mode is cleared with the longitudinal magnification as a reference or with the lateral magnification as a reference or both the longitudinal and lateral magnifications are increased or decreased.

17. The improvement as claimed in claim 1, further comprising: means for if said computed magnification ratios are greater than maximum magnification ratios available in said copier and/or smaller than minimum magnification ratios available in said copier, said maximum and/or minimum magnification ratios are set.

18. In a magnification changing system for a copier, the improvement:

wherein when any one of a document longitudinal, a document lateral, a copy longitudinal and a copy lateral key is depressed in an independent longitudinal and lateral dimension magnification change mode, all the data associated with said longitudinal, said lateral dimension magnification change are displayed and wherein said magnification ratio in both the longitudinal and lateral directions are automatically computed independently from each other and are computed at least in part from a manual input which indicates the input size in both the longitudinal and lateral directions of the area to be copied output size desired in longitudinal and lateral directions;

means for storing said computed magnification ratios for later use; and means for manually and numerically inputting the dimensions of the original and the size of the desired copied output.

19. The improvement as claimed in claim 18, wherein when data keyed in is present, said data or an underline is caused to flash while, when data keyed in is absent, only the underline is caused to flash.

20. The improvement as claimed in claim 18, wherein when dimensional magnification change is keyed in in the independent magnification change mode, the independent magnification change is reset.

21. The improvement as claimed in claim 18, wherein a particular key is pressed simultaneously with any of a zoom key, an enlarge key and a reduce key, priority is given to said particular key.

22. The improvement as claimed in claim 18, wherein dimension data are erased when another magnification change key is pressed or when automatic resetting is executed.

23. The improvement as claimed in claim 18, wherein a magnification is calculated when the same key is pressed again, when an enter key is pressed, or when a start key is pressed.

24. The improvement as claimed in claim 23, wherein a magnification is not changed when both the longitudinal dimension of a copy and the longitudinal dimension of a document are not entered.

25. The improvement as claimed in claim 23, wherein a magnification is not changed when both the lateral dimension of a copy and the lateral dimension of a document are not entered.

26. The improvement as claimed in claim 23, wherein when data set is greater than a maximum value of magnification change or smaller than a minimum value, said maximum value or said minimum value are selected as data while, at the same time, a warning is produced.

27. The improvement as claimed in claim 18, wherein when said computed magnification ratios are greater than maximum magnification ratios available in said copier and/or smaller than minimum magnification ratios available in said copier, said maximum and/or minimum magnification ratios are set.

28. A copier having a magnification changing system comprising:
   first inputting numerically means for inputting a longitudinal dimension of an area of a document to be copied;
   second inputting numerically means for inputting a lateral dimension of an area of a document to be copied;
   third inputting numerically means for inputting numerically a longitudinal dimension of a copied size;
   fourth inputting numerically means for inputting numerically a lateral dimension of a copied size;
   first computing means for automatically computing a magnification in the longitudinal direction from dimensions independently inputted by said first and third inputting means;
   second computing means for automatically computing a magnification in the lateral direction from dimensions independently inputted by said second and fourth inputting means;
   means for storing said computed magnification ratios for later use; and
   recording means for recording on a selected paper an image having said longitudinal and lateral dimensions inputted by said third and fourth inputting means respectively.

29. A copier as claimed in claim 28, in which when one of said dimensions is not inputted by said first, second, third and fourth inputting means, the longitudinal or lateral magnification for said one of said dimensions is a given magnification.

30. A copier as claimed in claim 28, wherein when said computed magnification ratios are greater than maximum magnification ratios available in said copier and/or smaller than minimum magnification ratios available in said copier, said maximum and/or minimum magnification ratios are set.

31. A magnification changing system for a copier, comprising:
   commanding means for commanding an independent longitudinal and lateral magnification change mode;
   means responsive to a command from said commanding means for displaying all input areas associated with dimensions which should be inputted;
   first inputting numerically means for inputting a longitudinal dimension of an area of a document to be copied;
   second inputting numerically means for inputting a lateral dimension of an area of a document to be copied;
   third inputting numerically means for inputting a longitudinal dimension of a copied size;
   fourth inputting numerically means for inputting a lateral dimension of a copied size;
   means for automatically computing a magnification in the longitudinal direction from dimensions independently inputted by said first and third inputting means;
   means for storing said computed magnification ratios for later use; and
   means for automatically computing a magnification in the lateral direction from dimensions independently inputted by said second and fourth inputting means.

32. The magnification changing system as claimed in claim 31, wherein said computed magnification ratios are greater than maximum magnification ratios available in said copier and/or smaller than minimum magnification ratios available in said copier, said maximum and/or minimum magnification ratios are set.

33. A magnification changing system for a copier comprising:
   first inputting means for inputting numerically a longitudinal dimension of an area of a document to be copied;
   second inputting means for inputting numerically a lateral dimension of an area of a document to be copied;
   third inputting means for inputting numerically a longitudinal dimension of a copied size;
   fourth inputting means for inputting numerically a lateral dimension of a copied size;
   means for automatically computing a magnification in the longitudinal direction from dimensions independently inputting by said first and third inputting means;
   means for storing said computed magnification ratios for later use; and
   means for automatically computing a magnification in the lateral direction from dimensions independently inputted by said second and fourth inputting means.

34. The magnification changing system as claimed in claim 33, wherein when said computed magnification ratios are greater than maximum magnification ratios available in said copier and/or smaller than minimum magnification ratios available in said copier, said maximum and/or minimum magnification ratios are set.

35. A copier having a magnification change system comprising:

commanding means for commanding an independent longitudinal and lateral magnification change mode;

means responsive to a command from said commanding means for displaying all input areas associated with dimensions which should be inputted;

first inputting numerically means for inputting numerically a longitudinal dimension of an area of a document to be copied;

second inputting numerically means for inputting numerically a lateral dimension of an area of a document to be copied;

third inputting numerically means for inputting numerically a longitudinal dimension of a copied size;

fourth inputting numerically means for inputting numerically a lateral dimension of a copied size;

first computing means for automatically computing a magnification in the longitudinal direction from dimensions independently inputted by said first and third inputting means;

second computing means for automatically computing a magnification in the lateral direction from dimensions independently inputted by said second and fourth inputting means;

means for storing said computed magnification ratios for later use; and recording means for recording on a selected paper an image having said longitudinal and lateral dimensions inputted by said third and fourth inputting means respectively.

36. A copier as claimed in claim 35, in which when one of said dimensions is not inputted by said first, second, third and fourth inputting means, the longitudinal magnification or lateral magnification for said one of said dimensions is a given magnification.

37. A copier as claimed in claim 36, in which said given magnification corresponds to a magnification before an independent longitudinal and lateral magnification change mode is set.

38. A copier as claimed in claim 35, further comprising: means for it computed magnification ratios are greater than maximum magnification ratios available in said copier and/or smaller than minimum magnification ratios available in said copier, said maximum and/or minimum magnification ratios are set.

* * * * *